(12) United States Patent
Kashiwagi et al.

(10) Patent No.: US 6,577,319 B1
(45) Date of Patent: Jun. 10, 2003

(54) METHOD FOR CONTROLLING DATA DISPLAY

(75) Inventors: Koichi Kashiwagi, Tenri (JP); Naoki Urano, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/398,023

(22) Filed: Sep. 17, 1999

(30) Foreign Application Priority Data

Sep. 18, 1998 (JP) .......................... 10-264359
Dec. 10, 1998 (JP) .......................... 10-351223

(51) Int. Cl.[7] .......................... G06F 15/00; G06T 15/00
(52) U.S. Cl. .......................... 345/581; 345/606; 345/619; 345/643; 345/650; 345/722
(58) Field of Search .......................... 345/428, 581, 345/586, 600, 603, 606–607, 610, 619, 622, 636, 643, 649, 650, 652, 657, 659, 661, 663, 676, 678, 688, 722, 474

(56) References Cited

U.S. PATENT DOCUMENTS

| | | | |
|---|---|---|---|
| 5,461,619 A | * | 10/1995 | Citta et al. .................... 370/83 |
| 5,479,603 A | * | 12/1995 | Stone et al. ................. 345/161 |
| 5,495,567 A | * | 2/1996 | Iizawa et al. ................ 345/161 |
| 5,504,907 A | * | 4/1996 | Steward et al. ............. 345/750 |
| 5,600,833 A | * | 2/1997 | Senn et al. ................... 345/601 |
| 5,613,134 A | * | 3/1997 | Lucus et al. ................. 345/788 |
| 5,621,874 A | * | 4/1997 | Lucas et al. ................. 345/761 |
| 5,656,005 A | * | 8/1997 | Cummings et al. ............ 493/3 |
| 5,736,991 A | * | 4/1998 | Tada .......................... 345/474 |
| 5,835,099 A | * | 11/1998 | Marimont .................... 345/589 |
| 5,905,992 A | * | 5/1999 | Lucas et al. ................. 707/514 |
| 6,134,256 A | * | 10/2000 | Chenausky .................. 372/61 |
| 6,151,610 A | * | 11/2000 | Senn et al. .................. 707/516 |

OTHER PUBLICATIONS

"Graphical Fisheye Views of Graphs"; Proc. of ACM SIGCHI '92, 1992, by M. Sarkar and M. H. Brown.

* cited by examiner

Primary Examiner—Matthew C. Bella
Assistant Examiner—Wesner Sajous
(74) Attorney, Agent, or Firm—Armstrong, Westerman & Hattori, LLP

(57) ABSTRACT

A method for controlling a data display of the present invention, controlling a display of data including at least one attribute, includes: an attribute conversion step of converting at least one attribute of the data into a display attribute by using at least one mapping function; a display step of displaying the data based on the display attribute; and a parameter changing step of changing a parameter of the mapping function.

9 Claims, 28 Drawing Sheets

40021~40028 : OUTER CIRCLE 40020

FIG. 4A $$g(x) = \exp\left(-\frac{1}{2}x^2\right)$$
$$g(x) = \frac{1}{x^2+1}$$
$$g(x) = 1 - \frac{(\exp(x)-\exp(-x))^2}{(\exp(x)+\exp(-x))^2}$$

⎫ Formula 1

FIG. 4B $$G(x) = g'(x) = \mathrm{atan}(x)$$
$$G(x) = g'(x) = \tanh(x)$$

⎫ Formula 2

FIG. 4C $$f(x) = G(x) + \alpha x + \beta = A \cdot \mathrm{atan}(x) + \alpha x + \beta \quad \cdots \text{Formula 3}$$

FIG. 4D $$g(x,y) = A \cdot \frac{1}{\left(\frac{x-\mu_x}{\sigma_x}\right)^2 + \left(\frac{y-\mu_y}{\sigma_y}\right)^2 - 2\rho\frac{x-\mu_x}{\sigma_x}\frac{y-\mu_y}{\sigma_y}+1} \quad \cdots \text{Formula 4}$$

FIG. 4E $$2\rho \left| \frac{x-\mu_x}{\sigma_x} \frac{y-\mu_y}{\sigma_y} \right| \quad \cdots \text{Formula 5}$$

FIG. 4F $$\frac{x-\mu_x}{\sigma_x} = r\cos\theta, \quad \frac{y-\mu_y}{\sigma_y} = r\sin\theta \quad \cdots \text{Formula 6}$$

FIG. 4G $$g(r,\theta) = A \cdot \frac{1}{\frac{r^2}{1-\rho^2} - 2\rho\cos(\theta-\phi)\sin(\theta-\phi)+1} \quad \cdots \text{Formula 7}$$

FIG. 5

| PARAMETER | PART OF GUI-WIDGET | OPERATION |
|---|---|---|
| CENTER(x,y) | INNER CIRCLE(POSITION) | PRESS BUTTON A ON INNER CIRCLE AND THEN DRAG IT |
| LOCAL MAXIMUM COEFFICIENT | INNER CIRCLE(COLOR) | PRESS BUTTON B ON INNER CIRCLE AND THEN MOVE MOUSE CURSOR (UPWARD:INCREASE, DOWNWARD:DECREASE) |
| STANDARD DEVIATION OF X | ARCS OF OUTER CIRCLE 40021, 40022 | PRESS BUTTON A ON ARC AND THEN DRAG IT |
| STANDARD DEVIATION OF Y | ARCS OF OUTER CIRCLE 40023, 40024 | PRESS BUTTON A ON ARC AND THEN DRAG IT |
| CORRELATION COEFFICIENT | ARCS OF OUTER CIRCLE 40025, 40026 | PRESS BUTTON A ON ARC AND THEN DRAG IT |
| | ARCS OF OUTER CIRCLE 40027, 40028 | PRESS BUTTON B ON ARC AND THEN DRAG IT |
| ROTATION | OUTER CIRCLE | |

$$2\rho \; \frac{x-\mu_x}{\sigma_x} \; \frac{y-\mu_y}{\sigma_y} \quad \cdots \text{Formula 8}$$

FIG. 9

| PARAMETER SET ID | CENTER (x,y) | LOCAL MAXIMUM COEFFICIENT | STANDARD DEVIATION OF X | STANDARD DEVIATION OF Y | CORRELATION COEFFICIENT | ROTATION |
|---|---|---|---|---|---|---|
| PS001 | 0.75, 0.43 | 0.34 | 0.05 | 0.05 | 0.00 | 0.0 |
| PS002 | 0.22, 0.65 | 0.62 | 0.07 | 0.05 | −0.75 | 30.0 |
| ......... | ......... | ......... | ......... | ......... | ......... | ......... |

FIG. 10

| GUI-WIDGET ID | POSITION (x,y) | COLOR OF INNER CIRCLE | RADIUS OF ARC 40021/40022 | RADIUS OF ARC 40023/40024 | RADIUS OF ARC 40025/40026 | RADIUS OF ARC 40027/40028 | ROTATE |
|---|---|---|---|---|---|---|---|
| W001 | 0.75, 0.43 | 0.34 | 0.10 | 0.10 | 0.10 | 0.10 | 0.0 |
| W002 | 0.22, 0.65 | 0.62 | 0.12 | 0.10 | 0.15 | 0.10 | 30.0 |
| ......... | ......... | ......... | ......... | ......... | ......... | ......... | ......... |

*FIG.11*

| GUI-WIDGET ID | PARAMETER SET ID |
|---|---|
| W001 | PS001 |
| W002 | PS002 |
| ⋮ | ⋮ |

FIG.20

| | |
|---|---|
| Figure 13 | Local maximum ⟶ Large |
| Figure 14 | Standard deviation of x ⟶ Large |
| Figure 15 | Standard deviation of x ⟶ Large, Rotation 45° |
| Figure 16 | Standard deviation of x ⟶ Large, Standard deviation of y ⟶ Large, Correlation coefficient (type 1) −0.75 |
| Figure 17 | Standard deviation of x ⟶ Large, Standard deviation of y ⟶ Large, Correlation coefficient (type 2) 0.75 |
| Figure 18 | Standard deviation of x ⟶ Large, Standard deviation of y ⟶ Large, Correlation coefficient (type 2) −0.75 |
| Figure 19 | Movement of a center |

$$p_j^b = F(p_i^a) \quad \cdots \text{Formula 10}$$

FIG.26

| GROUP ID | OPERATION TYPE | PARAMETER SET ID(s) |
|---|---|---|
| OG001 | AVERAGE | PS001–PS002–PS003 |
| ...... | ...... | ...... |

FIG.27

| GROUP ID | CONSTRAINT TYPE | PARAMETER SET ID(s) | CONSTRAINT FUNCTION $pb=F(pa)$ | $pa$ | $pb$ |
|---|---|---|---|---|---|
| CG001 | OneToOne | PS001 – PS003 | F1 | STANDARD DEVIATION OF X | STANDARD DEVIATION OF Y |
| CG002 | Group | PS002 – PS003 | F2 | CENTER (x,y) | CENTER (x,y) |
| ...... | ...... | ...... | ...... | ...... | ...... |

FIG.35

$$R(x,y) = \left\{ \left(\frac{x-\mu_x}{\sigma_x}\right)^2 + \left(\frac{y-\mu_y}{\sigma_y}\right)^2 - 2\rho \frac{x-\mu_x}{\sigma_x} \frac{y-\mu_y}{\sigma_y} \right\}^{\frac{1}{2}} \quad \cdots \text{Formula 11}$$

FIG.36

$$G(r) = \frac{(1+d)r}{dr+1} \quad \cdots \text{Formula 9}$$

METHOD FOR CONTROLLING DATA DISPLAY

BACKGROUND OF THE INVENTION

1. Field of the Invention

The present invention relates to control of a display attribute when data having an attribute-attribute value pair is displayed on a display apparatus.

2. Description of the Related Art

Heretofore, a number of systems have been proposed and made commercially available, which reflect data processed by an application program operating on a computer onto a display apparatus, and represents the data to a user.

In the above-mentioned systems, an attribute of data is converted into a display attribute such as a coordinate value on a display and color, and thus displayed. According to most of the conversions, one display attribute is linearly mapped with respect to one attribute.

On the other hand, the following technique has been proposed: an arbitrary region is enlarged and the other region is reduced by modifying a coordinate system among display attributes.

According to "Graphical Fisheye Views of Graphs: M. Sarkar and M. H. Brown, In Proc. ACM SIGCHI '92, 1992" (Prior Art 1), a two-dimensional polar coordinate system is modified by a radius component r, as represented by Formula 9 in FIG. 36. In Formula 9, d denotes a distortion factor.

Furthermore, Japanese Laid-Open Publication No. 7-320079 (Prior Art 2) describes the following: in the case of using a plurality of modification formulae in Prior Art 1 (i.e., in the case of providing a plurality of enlargement centers), according to a method for calculating a coordinate value by each modification formula, and averaging the obtained calculated coordinate values, modification which a user desires cannot be obtained, and setting parameters by trial and error is required.

In order to solve the above-mentioned problem, Prior Art 2 proposes a technique of determining a region to be modified so as not to cause interference with respect to each modification formula, and modifying each region, without averaging a plurality of modification formulae.

Furthermore, according to "3-Dimensional Pliable Surfaces: For the Effective Presentation of Visual Information: M. S. T. Carpendale, D. J. Cowperthwaite and F. D. Francchia, In Proc. UIST '95, 1995" (Prior Art 3), utilizing a perspective in a three-dimensional display, a display of a plane parallel to a user's line of sight is modified by being attached to a curved plane generated by a two-variable Gaussian function.

However, according to Formula 9 of Prior Art 1, as a parameter for controlling modification, only the distortion factor d is included. Thus, only a one-dimensional circle is modified. More specifically, Prior Art 1 is not ready for the case where only a region represented by a rectangle or an oval is desired to be enlarged.

According to Prior Art 2, when an average is obtained from a plurality of modification formulae, setting parameters by trial and error is required. However, it is unlikely to consider that a user becomes confused when taking an average. It is rather considered that the problem of Prior Art 2 is caused because the formulae lack flexibility and a user cannot intuitively and freely set parameters.

Prior Art 3 uses Gaussian function, so that free modification is possible by utilizing parameters of Gaussian function. However, Prior Art 3 uses a three-dimensional space for modifying a two-dimensional plane; therefore, Prior Art 3 is not ready for a three-dimensional data display.

Furthermore, the above-mentioned three prior art references disclose at least one parameter for modification. However, they fail to disclose a method for a user to intuitively and freely alter the parameter.

Furthermore, the above-mentioned three prior art references particularly pay attention to mapping onto a display coordinate system among display attributes. Regarding mapping onto the other display attributes, there are not techniques of altering parameters of a function used for mapping. As a similar technique, there is a technique of generating "gradation of an arbitrary rectangular region", such as a paint tool and a draw tool. In most cases, patterns of gradation are previously given, and a user only controls a direction and colors at a starting point/an ending point of gradation.

SUMMARY OF THE INVENTION

A method for controlling a data display is provided. The data includes at least one attribute, and the method includes: an attribute conversion step of converting at least one attribute of the data into a display attribute by using at least one mapping function; a display step of displaying the data based on the display attribute; and a parameter changing step of changing a parameter of the mapping function.

In one embodiment of the present invention, the parameter changing step includes a step of changing the parameter based on a desired timing in accordance with a user's instruction.

In another embodiment of the present invention, the parameter changing step includes a step of changing a parameter by using a GUI-widget.

In another embodiment of the present invention, the at least one mapping function includes a shape function, and the shape function represents an arbitrary shape with at least one attribute to be converted being a variable.

In another embodiment of the present invention, the shape function includes a center parameter representing a center of the shape function and a velocity parameter representing a velocity to the center, the parameter changing step includes a step of selecting at least one of the center parameter, the velocity parameter, and a local maximum value parameter controlling a value of the at least one mapping function when the at least one mapping function is an angular type function which becomes a local maximum at the center of the shape function, and using the selected parameter as a parameter set of the at least one mapping function.

In another embodiment of the present invention, the shape function includes a center parameter representing a center of the shape function and a velocity parameter representing a velocity to the center, and the parameter changing step includes a step of selecting at least one of the center parameter, the velocity parameter, and a local maximum value parameter controlling a value of the at least one mapping function when the at least one mapping function is an increase type function in which a derivative of the mapping function becomes a local maximum at the center of the shape function, and using the selected parameter as a parameter set of the at least one mapping function.

In another embodiment of the present invention, the shape function includes a multi-dimensional function using a plurality of the attributes to be converted as variables, the shape function includes a center parameter representing a center of the shape function, corresponding to each of the variables, a velocity parameter representing a velocity to the center, corresponding to each of the variables, a correlation parameter representing a correlation between the variables, and a rotation parameter representing rotation of a parameter space, and the parameter changing step is a function for calculating one arbitrary value of the display attributes, and includes a step of selecting at least one of the center parameter, the velocity parameter, the correlation parameter, the rotation parameter, and a local maximum value parameter controlling a value of the at least one mapping function when the at least one mapping function is an angular type function in which the at least one mapping function becomes a local maximum at the center of the shape function, and using the selected parameter as a parameter set of the at least one mapping function.

In another embodiment of the present invention, the shape function includes a multi-dimensional function using a plurality of the attributes to be converted as variables, the shape function includes a center parameter representing a center of the shape function, corresponding to each of the variables, a velocity parameter representing a velocity to the center, corresponding to each of the variables, a correlation parameter representing a correlation between the variables, and a rotation parameter representing rotation of a parameter space, and the parameter changing step is a function for calculating values of the same number of the display attributes as the number of the attributes to be converted included in the shape function, and includes a step of selecting at least one of the center parameter, the velocity parameter, the correlation parameter, the rotation parameter, and a local maximum value parameter controlling a value of the mapping function when the at least one mapping function is an increase type function in which a derivative of the mapping function becomes a local maximum at the center of the shape function, and using the selected parameter as a parameter set of the at least one mapping function.

In another embodiment of the present invention, the at least one mapping function includes an angular type mapping function which becomes a local maximum at a center of the shape function and an increase type mapping function in which a derivative of the mapping function becomes a local maximum at the center of the shape function, the at least one mapping function adopts one of the angular type mapping function and the increase type mapping function in a desired range of an attribute value of the attribute to be converted, and the at least one mapping function executes a linear mapping function out of the range of the attribute value.

In another embodiment of the present invention, the at least one mapping function includes a first mapping function and a plurality of second mapping functions, and the first mapping function is expressed by an operation using the plurality of second mapping functions.

In another embodiment of the present invention, when a plurality of the at least one mapping functions are present, a parameter changing constraint regarding a change in the parameter is provided between at least two arbitrary mapping functions.

In another embodiment of the present invention, the parameter changing constraint includes a constraint which uses at least one function when calculating a value of the parameter.

In another embodiment of the present invention, the at least one attribute to be converted and the display attribute belong to the same attribute.

In another embodiment of the present invention, the GUI-widget has a dual-circular shape including one circle and one annular ring, the at least one mapping function includes a function of a shape function, the shape function represents an arbitrary shape with at least one attribute to be converted being a variable, the shape function has a center parameter representing a center of the shape function, at least one of color and a size of the circle represents a local maximum value parameter for controlling a value of the at least one mapping function, a display position of the GUI-widget represents the center parameter representing a center of the shape function, and the annular ring is formed based on the shape function.

In another embodiment of the present invention, the shape function further includes a velocity parameter representing a velocity to the center of the shape function, and a distance between a center of the GUI-widget and the annular ring is determined based on the velocity parameter.

In another embodiment of the present invention, the shape function includes a multi-dimensional function with a plurality of the attributes to be converted being variables, the shape function includes a center parameter representing a center of the shape function, corresponding to each of the variables, a velocity parameter representing a velocity to the center, corresponding to each of the variables, a correlation parameter representing a correlation between the variables, and a rotation parameter expressing rotation of a parameter space, a distance between an arbitrary arc of the annular ring and a center of the GUI-widget represents the velocity parameter, a distance between another arc of the annular ring and a center of the GUI-widget represents the correlation parameter, and rotation of the annular ring represents the rotation parameter.

In another embodiment of the present invention, a value of the arbitrary parameter in the mapping function is changed by a user's operation with respect to the GUI-widget.

In another embodiment of the present invention, the GUI-widget has a dual-circular shape including one sphere and one hollow sphere, the at least one mapping function includes at least three attributes to be converted, the sphere is divided into mesh-shaped regions by using desired rectangles when the at least three attributes to be converted are displayed in the display step, the sphere is rotated by an angle based on user's instruction, and the GUI-widget is moved in a direction normal to the rectangle based on the user's instruction.

In another embodiment of the present invention, the GUI-widget has a dual-circular shape including one sphere and one hollow sphere, the at least one mapping function includes at least three attributes to be converted, the sphere is divided into mesh-shaped regions by using desired rectangles when the at least three attributes to be converted are displayed in the display step, the sphere is revolved in a direction opposite to rotation direction of a data display space, and the GUI-widget is moved in a direction normal to the rectangle based on user's instruction.

According to an aspect of the present invention, the above-mentioned objective can be achieved by using a general function as the mapping function. For example, a hyperbolic function of a tangent, a tangent, an arc tangent, derivatives thereof, Gaussian function, or a function obtained by indefinite integration of Gaussian function may be used. By using these functions, a more preferable operation which is compatible with a GUI-widget can be obtained.

According to another aspect of the present invention, in the case where an attribute value range is constant, a region to which the mapping function is applied can be made constant. On the other hand, in the case where an attribute value range is varied, a region to which the mapping function is applied can be altered dynamically.

According to still another aspect of the present invention, any same kind of parameters of a plurality of mapping functions can be simultaneously changed. In the case where different kinds of parameters are controlled, when a value of a particular parameter is changed in a certain mapping function, a value of a different kind of parameter of another mapping function can be simultaneously changed.

Thus, the invention described herein makes possible the advantages of (1) providing a method for enhancing power of expression of a function for mapping an attribute of data onto a display attribute, and allowing a user to intuitively and freely alter parameters of the function corresponding to the power of expression; (2) providing an apparatus using the above-mentioned method; (3) providing a recording medium using the above-mentioned method; (4) providing a user interface controller for visualizing a data group having attributes by displaying them on a coordinate system, determining a coordinate peculiar to data based on its attributes, using some function in a place which is not visible on a display screen while modifying the function, and controlling parameters of the function; (5) continuously displaying data concentrated around the controller in an emphasized manner by moving the controller to change the coordinates of the data so as to alter the state of a display; and (6) for visual expression, controlling display attributes such as display color, transparency, painting-out, and color and width of a frame line, in addition to coordinates.

These and other advantages of the present invention will become apparent to those skilled in the art upon reading and understanding the following detailed description with reference to the accompanying figures.

BRIEF DESCRIPTION OF THE DRAWINGS

FIGS. 4A to 4G illustrate a mapping function according to the present invention.

FIG. 5 is an example of a correspondence table showing parts of a GUI-widget, an operation method, and parameters of a mapping function of the GUI-widget according to the present invention.

FIG. 9 shows an example of a table describing parameter information of the mapping function according to the present invention.

FIG. 10 shows an example of a table describing information regarding the GUI-widget according to the present invention.

FIG. 11 shows an example of a table describing a correspondence relationship between the GUI-widget and the parameter information of the mapping function according to the present invention.

FIG. 20 illustrates alteration contents of parameters in the mapping function according to the present invention.

FIG. 26 shows a description example of operation group information of the mapping function according to the present invention.

FIG. 27 shows a description example of restriction group information of the mapping function according to the present invention.

FIG. 35 illustrates a function representing an arbitrary shape in the mapping function according to the present invention.

FIG. 36 illustrates a conventional function for modifying a coordinate system.

DESCRIPTION OF THE PREFERRED EMBODIMENTS

Hereinafter, the present invention will be described by way of illustrative embodiments with reference to the drawings.

Embodiment 1

First, Embodiment 1 according to the present invention will be described.

The present invention provides a method for preparing a function which allows an arbitrary attribute to correspond to a display attribute such as a coordinate value on a display and color in an application program which displays data having an attribute-attribute value pair on a display apparatus, and allowing a user utilizing the application program to freely alter parameters of the function.

Figure 1:
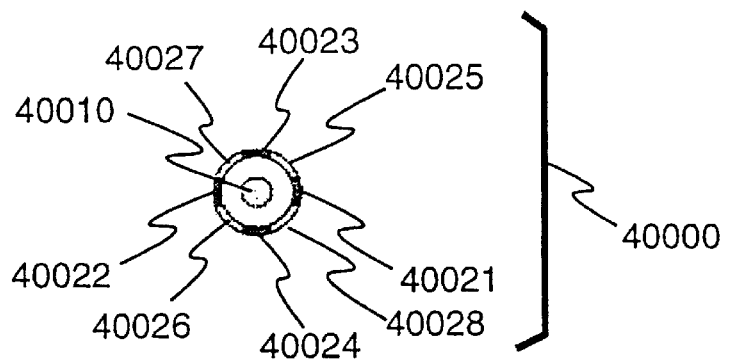
FIG. 1 shows an example of a two-dimensional GUI (graphical user interface)-widget according to the present invention.

As an altering unit, a GUI (graphical user interface)-widget as shown in FIG. 1 is prepared, and parameters of a function are altered in accordance with a user's operation with respect to the GUI-widget.

Figure 2:
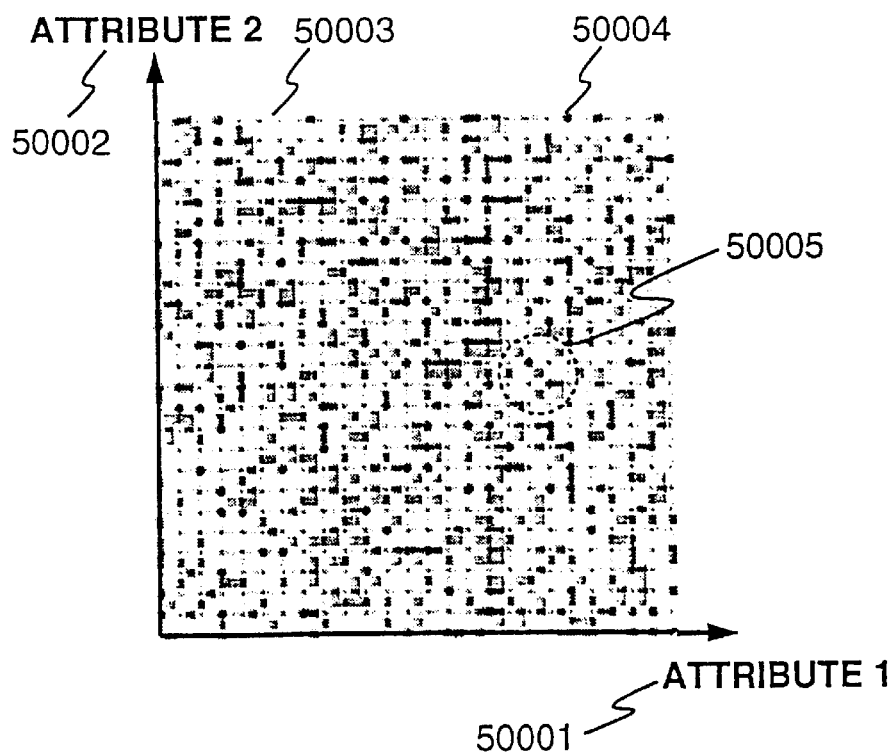
FIG. 2 shows a display example before the two-dimensional GUI-widget according to the present invention is provided.
Figure 3:
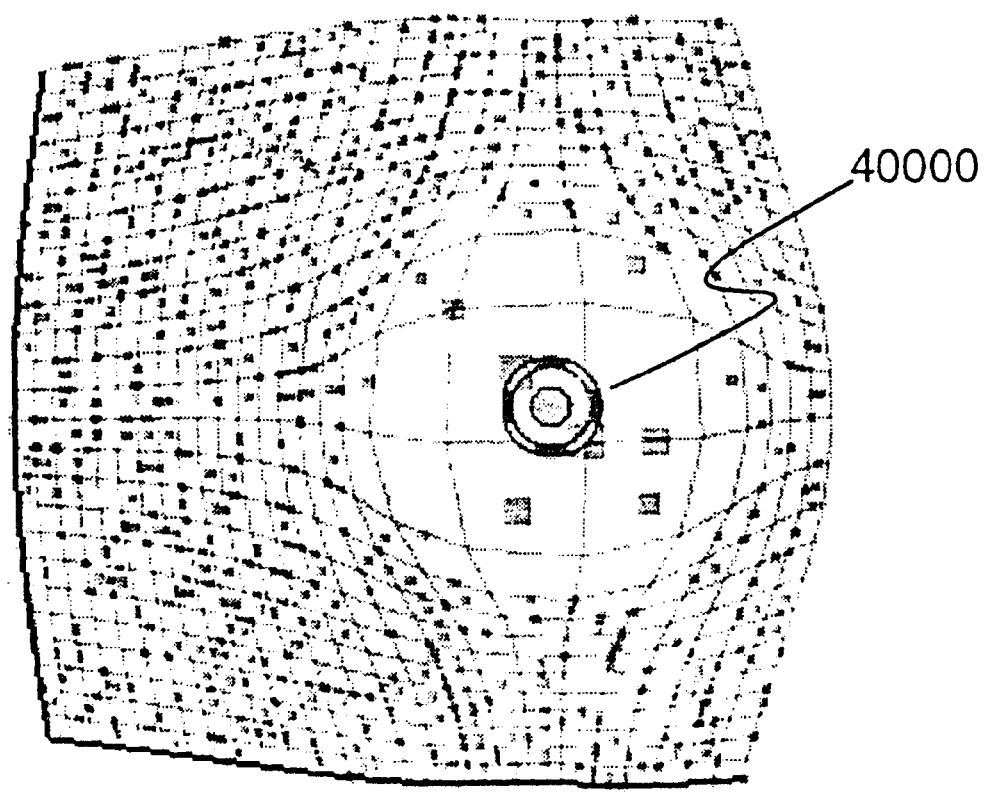
FIG. 3 shows a display example when the two-dimensional GUI-widget according to the present invention is provided.

For example, when a user places the GUI-widget in a display region 50005 as shown in FIG. 2, the display region 50005 is modified (see FIG. 3). It seems that the display in FIG. 3 is obtained merely by modifying the display in FIG. 2. However, actually, parameters for mapping attributes 1 and 2 in FIG. 2 onto coordinates on an abscissa axis and an ordinate axis, respectively, are altered. Simultaneously, the size of a display object 50004 representing individual data in FIG. 2 is calculated from the attributes 1 and 2. More specifically, data having attribute values of the attributes 1 and 2 corresponding to a position where the GUI-widget is placed is displayed in the largest size, and data away from that position is displayed relatively small.

First, a function for converting an attribute of data into a display attribute (i.e., a mapping function) will be described.

The mapping function of the present invention is either an angular type (in which a function has a local maximum value) or a monotonous increase type (in which a slope of the function has a local maximum value).

FIG. 4A shows representative examples of an angular type function. Formula 1 shown in FIG. 4A represents functions in the case of one variable.

Each function obtained by indefinite integration of the above-mentioned functions becomes a monotonous increase type. Among these three functions, the first one is a Gausian function, whose indefinite integration is obtained by series expansion. Furthermore, indefinite of the other two functions are represented by Formula 2 shown in FIG. 4B.

In Formula 2, a tan(x) and tan h(x) represent an inverse function and a hyperbolic function of a tangent, respectively.

In the present embodiment, the second function among the above-mentioned three angular types is used as an angular type mapping function, and a function based on a tan(x) which represents indefinite integration is used as a monotonous increase type function. The function based on a tan(x) is represented by Formula 3 shown in FIG. 4C.

In Formula 3, A represents an arbitrary coefficient; and $\alpha$ and $\beta$ represent coefficients of linear components contained in the mapping function. More specifically, the monotonous increase type mapping function adds, by a tan(x), non-linearity to a straight line determined by the coefficients $\alpha$ and $\beta$. Assuming that A=0, Formula 3 represents a linear mapping function.

The coefficients $\alpha$ and $\beta$ of the linear components of the mapping function can be obtained from a range over which the mapping function extends. For example, assuming that, in Formula 3, the mapping function has an effect on the range of (−r, r) with respect to 0, and the center and the r (or −r) point take the same values as those in the linear mapping function, the coefficients $\alpha$ and $\beta$ can be easily obtained by solving simultaneous equations. Hereinafter, it is assumed that, in the present embodiment, the range over which the mapping function extends is constant; however, actually, the range may change in accordance with parameters of the mapping function described later.

Next, parameters of the mapping function will be described.

The mapping function of the present invention has several kinds of parameters. In the case of a one-variable function, the parameters include three kinds: a local maximum value of the function, a variable (x in Formula 3) (center) at the local maximum value, and a velocity to the local maximum value. In the case of a multi-variable function, the parameters include 5 kinds: a local maximum value of the function, a variable (x in Formula 3) (center) at a local maximum value, a velocity to a local maximum value, a correlation coefficient of each variable, and rotation of a parameter space. These parameters allow mapping with satisfactory power of expression to be realized.

Formula 4 in FIG. 4D represents a two-variable angular type function using four kinds of parameters excluding rotation.

In Formula 4, $\mu x$ and $\mu y$ represent centers of x and y, respectively: $\sigma x$ and $\sigma y$ represent velocities of x and y, respectively: $\rho$ represents a correlation coefficient of x and y, and A represents a local maximum value.

Assuming that the term multiplied by the correlation coefficient a in Formula 4 is represented by Formula 5 in FIG. 4E, a star shape, an oval close to a rectangle, and the like having four vertices can be expressed.

The rotation among the above-mentioned parameters will be described by converting the function represented by Formula 5 into polar coordinates, as represented by Formula 6 in FIG. 4F, for simplicity.

When rotation $\phi$ is substituted into Formula 6, Formula 7 in FIG. 4G is obtained.

Thus, a velocity and a correlation coefficient among the parameters of the angular function rotate by $\phi$ in a parameter space.

Next, a monotonous increase type function will be described.

A monotonous increase type function can be expressed by indefinite integration of an angular type function; therefore, the parameters of the monotonous increase type function have the same meanings as those of the angular type function. However, regarding the monotonous increase type function, in the case of a multi-variable, the number of variables is the same as that of display attributes calculated by the mapping function, and each variable should correspond to each display attribute in one-to-one relationship. In the present embodiment, in the case of a multi-variable, a rectangular coordinate system is converted into a polar coordinate system, mapping in a radial direction in the polar coordinate system is calculated, and the results thus obtained are converted into the original rectangular coordinate system.

Instead of converting a rectangular coordinate system into a polar coordinate system in accordance with Formula 6, the rectangular coordinate system may be converted into the polar coordinate system in such a manner that a velocity parameter after conversion changes in accordance with an angle of the polar coordinate system. For example, the rectangular coordinate system may be converted into the polar coordinate system in such a manner that when a velocity parameter is plotted onto a two-dimensional coordinate system, the shape of the plot becomes a rectangle.

The mapping function has been described in the case where a monotonous increase type function is a tan(x), and an angular type function is differentiation of a tan(x). As the mapping function, tan h(x), a function obtained by differentiation of tan h(x), Gaussian function, etc. may be used. As the angular type function, a function {1−g(x)} where g(x) is an angular type function may be used.

Next, a two-dimensional GUI-widget according to the present invention will be described.

Regarding parameters of the above-mentioned mapping function, a local maximum value of the function or a local maximum value of a slope of the function, an attribute value of an attribute to be converted at a local maximum value, a standard deviation of an attribute to be converted, a correlation coefficient between attributes to be converted, and rotation of a parameter space are used as one parameter set. According to the present invention, a GUI-widget is provided, which allows a user to control a parameter set. FIG. 1 shows an example thereof.

A GUI-widget 40000 shown in FIG. 1 has a dual-circular shape, which is composed of an inner circle 40010 and an outer circle 40020. The outer circle 40020 is divided into 8 arcs 40021 to 40028 by an angle with respect to the center of the GUI-widget 40000.

Parts of the GUI-widget 40000 include a display position of the inner circle 40010 (equal to a display position of the GUI-widget 40000), color of the inner circle 40010, and a distance from the center to each arc of the outer circle 40020. The outer display shape of the GUI-widget 40000 is changed by a user's operation with respect to each part of the GUI-widget, and parameters corresponding to parts of the GUI-widget are changed. FIG. 5 lists each part of the GUI-widget, parameters, and operations.

It is assumed that all the operations are performed by using a mouse having at least two buttons. Each operation is started by pressing a button corresponding to each part of the GUI-widget 40000, and the mouse is moved while the button is pressed down (i.e., the mouse is dragged). For example, in order to move a center among the parameters, a user moves a mouse cursor onto the inner circle 40010 and presses a button A. Then, the user moves the inner circle 40010 onto a desired display position while pressing down the button A.

Furthermore, the arcs of the outer circle 40020 facing each other form a pair of arcs. For example, the arcs 40021 and 40022 form a pair of arcs which represent a standard deviation of x. When a user conducts an operation so as to expand the arc 40021 to the right, the arc 40022 expands to the left in the same amount as that of the arc 40021, and the standard deviation of x is also changed correspondingly.

Furthermore, among the arcs 40025 to 40028 are assigned a correlation coefficient, a pair of the arcs 40025 and 40026 and a pair of the arcs 40027 and 40028 are modified in synchronization. For example, if the term of a correlation coefficient in the mapping function is calculated as represented by Formula 8 in FIG. 6, the outward movement of the arcs 40025 or 40026 modifies the correlation coefficient in a plus direction, and the arcs 40027 and 40028 move inward in the same amount as that of the outward movement of the arcs 40025 or 40026.

Hereinafter, a method for controlling a data display by using the above-mentioned mapping function and the GUI-widget will be described.

Figures 6, 7:
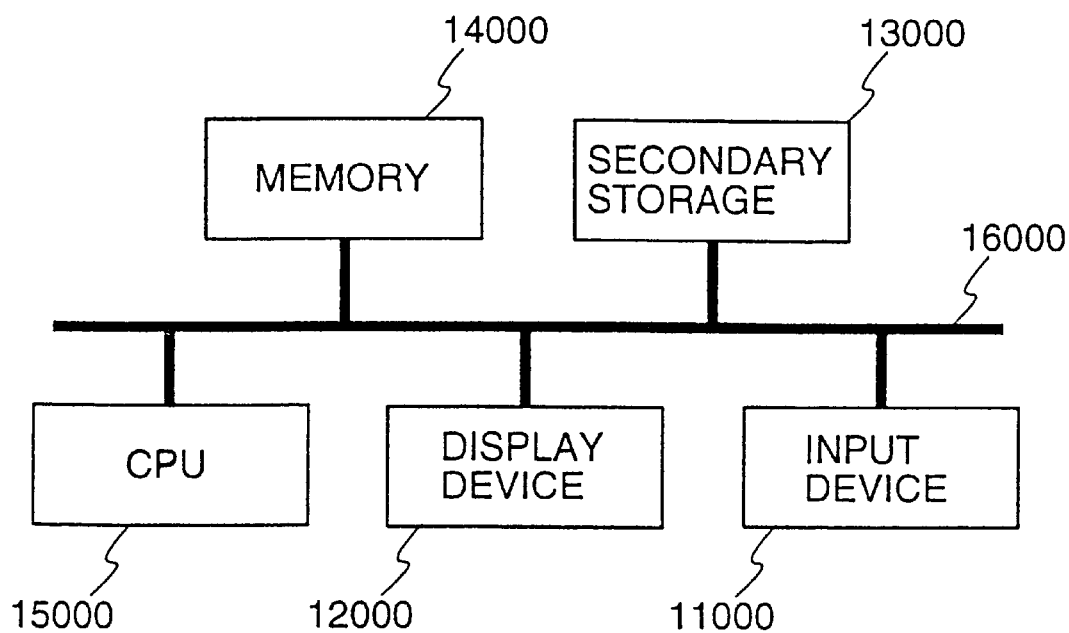
FIG. 6 illustrates the mapping function according to the present invention.
FIG. 7 is a diagram showing a structure of hardware for practicing the present invention.

FIG. 7 is a diagram showing a structure of hardware for practicing the present invention.

An input device 11000, a display device 12000, a secondary storage 13000, a memory 14000, and a CPU 15000 are connected to each other via a bus 16000. The method for controlling a data display of the present invention is stored in the secondary storage 13000 in the form of a program. The program is operated by the CPU 15000, and a required memory region is kept in the memory 14000 when the program is started. The input device 11000 is composed of a key board, a mouse, a glide point, and the like.

Figure 8:
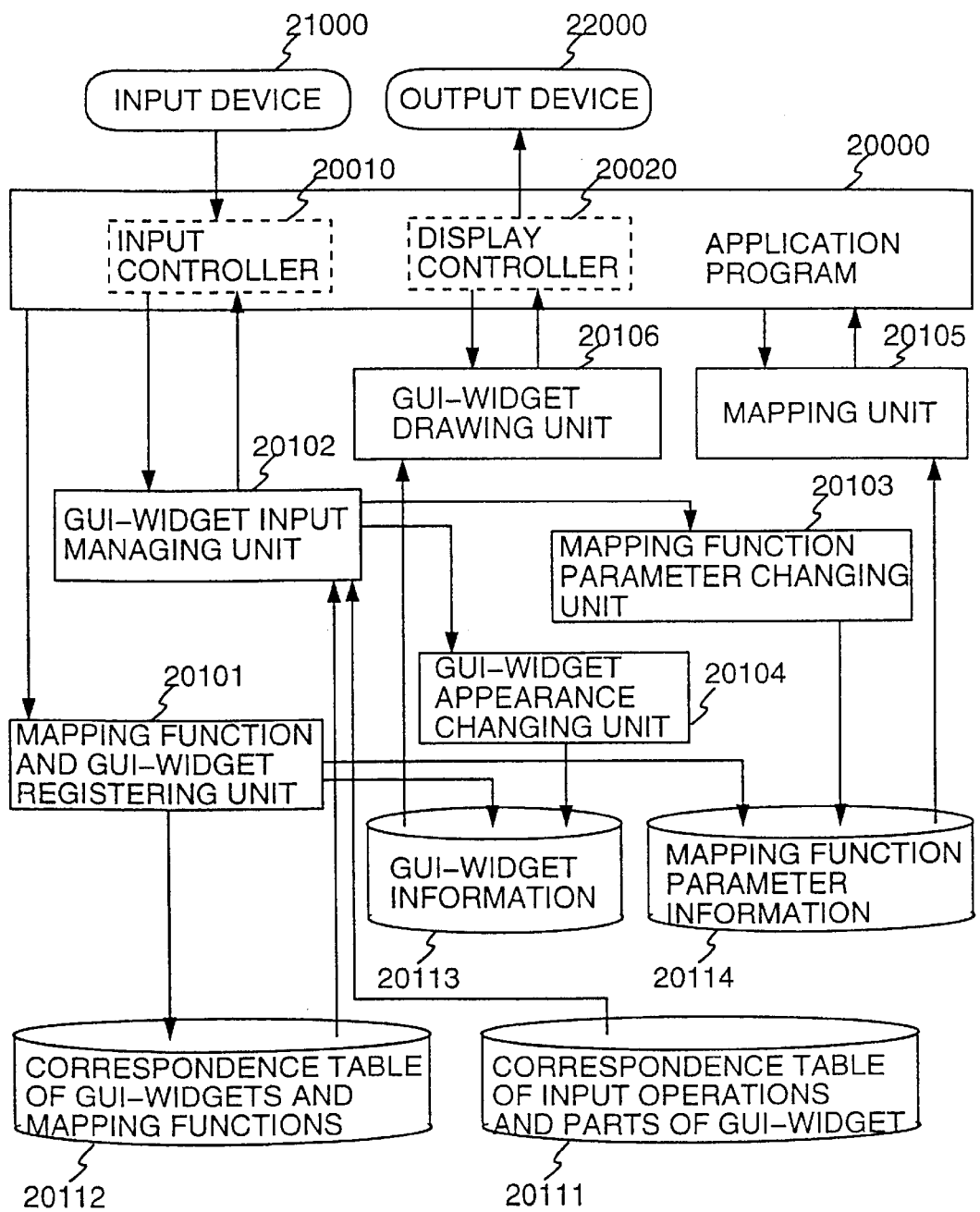
FIG. 8 is a diagram showing a logic structure for practicing Embodiment 1 of the present invention.

FIG. 8 is a block diagram for practicing the present invention.

The method for controlling a data display of the present invention is not one application program, but a method which functions as a tool to be used in an application program.

Thus, in FIG. 8, an input to an input device 21000 and an output from an output device 22000 are controlled by an input controller 20010 and a display controller 20020 of an application program 20000. A processing routine of the method according to the present invention is invoked by the application program 20000.

In FIG. 8, a mapping function and GUI-widget registering unit 20101 receives a request from the application program 20000, and registers a mapping function and a GUI-widget for controlling the mapping function in a correspondence table of GUI-widgets and mapping functions 20112, GUI-widget information 20113, and mapping function parameter information 20114 in a manner described later.

A GUI-widget input managing unit 20102 determines whether or not input operation information sent from, particularly, the input controller 20010 in the application program 20000 is an input to the GUI-widget, by referring to the correspondence table of GUI-widgets and mapping functions 20112 and a correspondence table of input operations and parts of GUI-widget 20111. If the input operation information is an input operation with respect to the GUI-widget, the GUI-widget input managing unit 20102 sends an ID of the GUI-widget to which the input operation information is input and an operation variable to a GUI-widget appearance changing unit 20104. The GUI-widget input managing unit 20102 also sends a parameter set ID of the mapping function corresponding to the GUI-widget to which the input operation information is input and an operation variable to a mapping function parameter changing unit 20103.

The GUI-widget appearance changing unit 20104 rewrites appearance information of the GUI-widget described in the GUI-widget information 20113, based on the ID of the GUI-widget and the operation variable sent from the GUI-widget input managing unit 20102. The mapping function parameter changing unit 20103 rewrites parameter information described in the mapping function parameter information 20114, based on the parameter set ID and the operation variable sent from the GUI-widget input managing unit 20102.

Furthermore, a GUI-widget drawing unit 20106 receives a request from, mainly, the display controller 20020 in the application program 20000, and generates a current appearance of the GUI-widget, by referring to the appearance information of the GUI-widget described in the GUI-widget information 20113.

Furthermore, a mapping unit 20105 receives a request from the application program 20000, and converts an attribute to be converted into a display attribute, by referring to the mapping function parameter information 20114. At this time, the mapping unit 20105 receives an arbitrary attribute value of the attribute to be converted (in the case of multi-dimension, a tuple of the attribute), and an attribute value of a display attribute after conversion (or a tuple of the attribute) is returned to the application program 20000.

Next, the correspondence table of input operations and parts of GUI-widget 20111, the correspondence table of GUI-widgets and mapping functions 20112, the GUI-widget information 20113, and the mapping function parameter information 20114 in FIG. 8 will be described in detail.

In the correspondence table of input operations and parts of GUI-widget 20111, the list shown in FIG. 5 is described.

FIG. 9 shows an example of the mapping function parameter information 20114. The parameter information is managed on a parameter set basis. Each parameter set includes a parameter set ID and parameters.

FIG. 10 shows an example of the GUI-widget information 20113. In the GUI-widget information 20113, an ID of a GUI-widget and appearance information of the GUI-widget described above are listed.

FIG. 11 shows an example of the correspondence table of GUI-widgets and mapping functions 20112. In this table, a correlation between a parameter set of a mapping function which is currently used in the application program 20000 and a GUI-widget is managed with an ID. When the mapping function and GUI-widget registering unit 20101 receives a request of registering a new parameter set from the application program 20000, the mapping function and GUI-widget registering unit 20101 assigns an ID to the new parameter set. The mapping function and GUI-widget registering unit 20101 further generates a GUI-widget corresponding to the new parameter set, and assigns an ID to the GUI-widget. The appearance of the GUI-widget to be generated is initialized so as to correspond to parameters contained in the parameter set. However, in the case where a parameter is not specified by the application program 20000, parameters are assigned initial values, and the appearance of the GUI-widget is formed so as to correspond to the initial values of the parameters. The mapping function and GUI-widget registering unit 20101 describes a pair of IDs in the correspondence table of GUI-widgets and mapping functions 20112, and registers a new parameter set in the mapping function parameter information 20114 and the corresponding GUI-widget in the GUI-widget information 20113.

Next, the operation of the present invention will be described by using a flow chart shown in FIG. 12.

Figure 12:
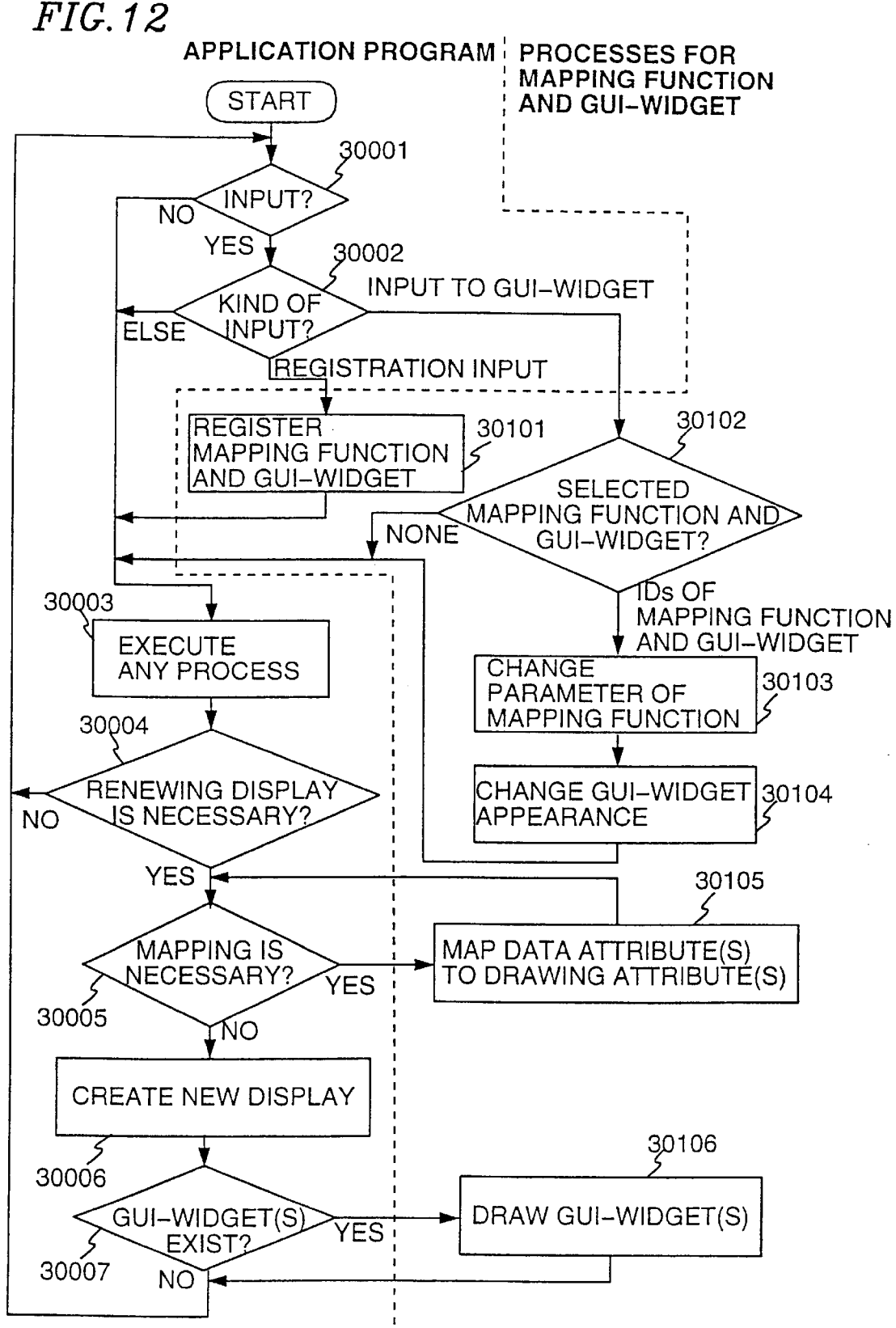
FIG. 12 is a flow chart illustrating an operation of the present invention.
Figure 13:
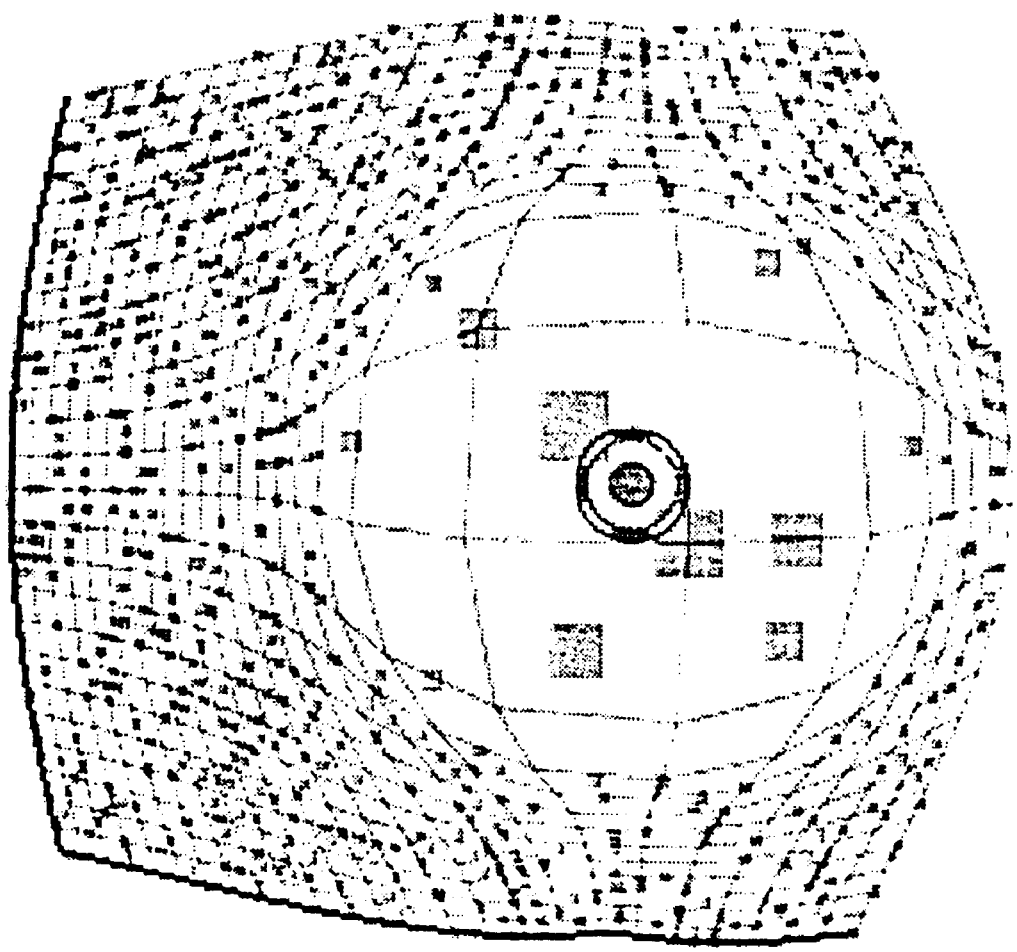
FIG. 13 shows a display example when the two-dimensional GUI-widget according to the present invention is provided.
Figure 14:
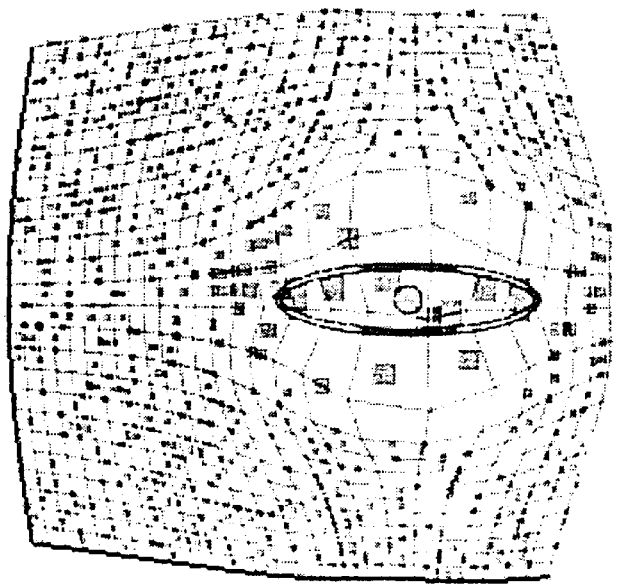
FIG. 14 shows a display example when the two-dimensional GUI-widget according to the present invention is provided.
Figure 15:
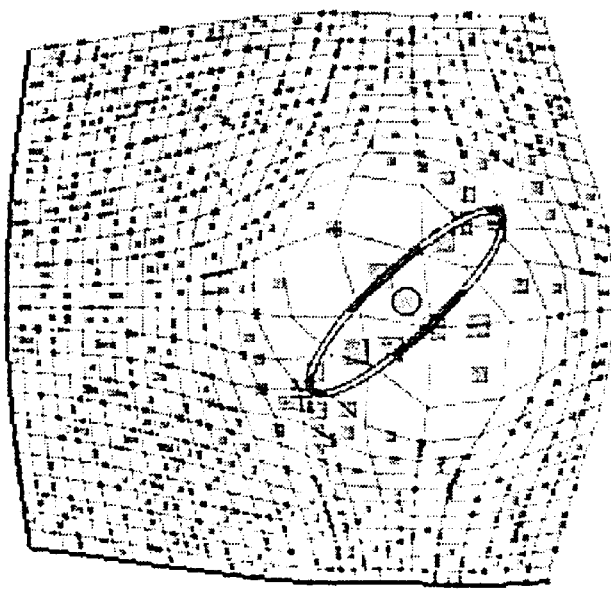
FIG. 15 shows a display example when the two-dimensional GUI-widget according to the present invention is provided.

In FIG. 12, a left part from a broken line shows a representative flow of an application program utilizing the method for controlling a data display of the present invention, and a right part from the broken line shows a flow of processing conducted by a GUI-widget and a mapping function.

First, the processing conducted by a GUI-widget and a mapping function will be described.

The processing conducted by a GUI-widget and a mapping function involves four procedures: step 30101, steps 30102–30104, step 30105, and step 30106. These procedures are appropriately invoked by the application program 20000.

At Step 30101, the mapping function and GUI-widget registering unit 20101 receives a request for registering a new mapping function and a new GUI-widget from the application program 20000, and registers the new mapping function and the new GUI-widget.

At Steps 30102 to 30104, processing with respect to a user's input operation to a GUI-widget is conducted. First, at Step 30102, the GUI-widget input managing unit 20102 determines to which GUI-widget an input operation is conducted. In the case where the GUI-widget input managing unit 20102 cannot determine to which GUI-widget an input operation is conducted, the GUI-widget input managing unit 20102 returns the processing to the application program 20000. In the case where the GUI-widget input managing unit 20102 can determine to which GUI-widget an input operation is conducted, the GUI-widget input managing unit 20102 stores an ID of a parameter set corresponding to an ID of the GUI-widget for the following steps. At Step 30103, the mapping function parameter changing unit 20103 alters parameters of the parameter set indicated by the parameter set ID. At Step 30104, the GUI-widget appearance changing unit 20104 alters appearance information of a GUI-widget indicated by the ID.

After these procedures, the processing is returned to the application program 20000.

At Step 30105, when the mapping function parameter changing unit 20103 receives an attribute value of an attribute to be converted, the mapping function parameter changing unit 20103 converts the attribute value of the attribute to be converted to an attribute value of a display attribute.

At Step 30106, the GUI-widget drawing unit 20106 receives a request for generating a display from the application program 20000, and generates a display using the newest appearance information on all the registered GUI-widgets.

Next, a flow on the application program side will be described.

The application program is described in the form of event driving. At Step 30001, it is determined whether or not a user conducts an input operation to the input device 21000. In the case where an input operation is not conducted, the procedure proceeds to Step 30003, and in the case where an input operation is conducted, the procedure proceeds to Step 30002.

At Step 30002, the kind of input operation is determined. If the input operation is an input to a GUI-widget of the present invention or an input of registering a mapping function and a GUI-widget, the procedure proceeds to Steps 30102 or 30101. Furthermore, in the case of another input operation, the procedure proceeds to Step 30003.

In the case where an input operation is not conducted at Step 30001 or in the case where an input operation at Step 30002 is not related to a GUI-widget of the present invention, processing peculiar to the application related to the input operation is conducted at Step 30003.

When Step 30003 is completed, it is checked if renewing a display is necessary at Step 30004. If renewing a display is not necessary, the procedure returns to Step 30001, and if renewing a display is necessary, the procedure proceeds to Step 30005.

At Step 30005, it is determined whether or not an attribute value of an arbitrary attribute is converted into an attribute value of a display attribute. In the case where mapping is necessary, Step 30105 is invoked, whereby an attribute value of an attribute is converted into an attribute value of a display attribute. At Step 30105, the attribute values required to be converted are invoked. When no attribute value is required to be converted any more, the procedure proceeds to Step 30006.

At Step 30006, a display is created by using the attribute value of the display attribute after conversion and the like. At Step 30007, it is determined whether or not the GUI-widget of the present invention is used. In the case where the GUI-widget of the present invention is not used, the procedure returns to Step 30001. In the case where the GUI-widget of the present invention is used, the procedure proceeds to Step 30106, and then returns to Step 30001.

Embodiment 2

In the present embodiment, a change in display in the case of using the method for controlling a data display of the present invention will be described.

FIG. 2 shows an example of a display screen before the GUI-widget shown in FIG. 1 is placed on a data display. In the present embodiment, an abscissa axis is assigned an attribute 1 and an ordinate axis is assigned an attribute 2. More specifically, the attributes 1 and 2 are mapped onto display attributes such as the abscissa axis and the ordinate axis, respectively. Reference numeral 50003 denotes a grid.

Herein, the following is assumed: the attributes 1 and 2 are taken as those to be converted. A monotonous increase type mapping function 1 for mapping the attributes 1 and 2 onto the abscissa axis and the ordinate axis of the display attributes is prepared. Similarly, the attributes 1 and 2 are taken as those to be converted. An angular type mapping function 2 for obtaining the size of a display object among display attributes is prepared. A parameter set of the mapping function is controlled by the GUI-widget shown in FIG. 1.

In this case, the attributes to be converted in the mapping function 1 are the same as those in the mapping function 2, and both the functions use the same parameters. Therefore, it is assumed that the parameters of the two mapping functions can be controlled by one GUI-widget. Each part of the GUI-widget is assigned each parameter of the mapping function as shown in FIG. 5.

FIG. 3 shows a display example when the GUI-widget 40000 is placed in a region 50005 in FIG. 2.

As is understood from deformation of the grid 50003, mapping of the attributes 1 and 2 onto a display coordinate system by the mapping function 1 is changed. Furthermore, due to the effect of the mapping function 2, the size of each display object around the GUI-widget is changed in accordance with a distance from the GUI-widget so as to correspond to the deformation of the grid 50003.

FIGS. 13 to 19 show display examples in the case where parameters of the mapping function are altered by operating the GUI-widget. FIG. 20 shows the relationship between each of FIGS. 13 to 19 and the content of parameters altered from those in FIG. 3.

Figure 16:
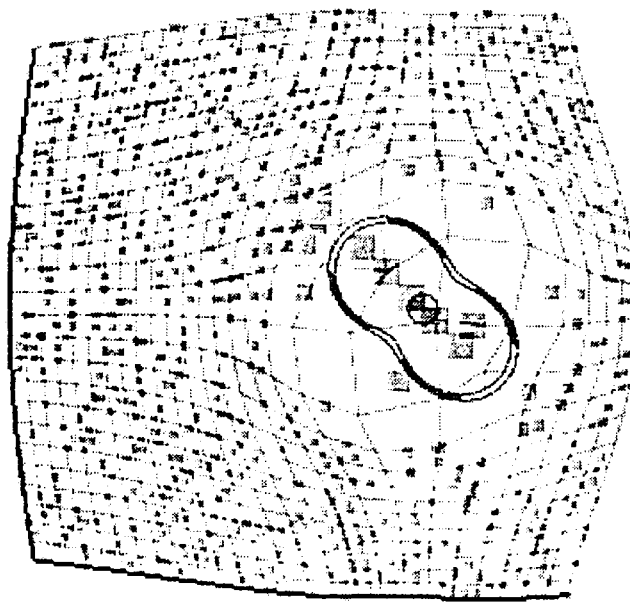
FIG. 16 shows a display example when the two-dimensional GUI-widget according to the present invention is provided.
Figure 17:
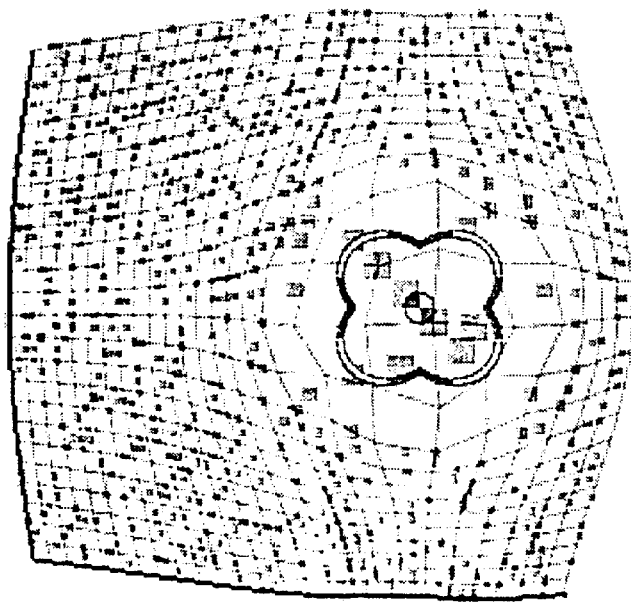
FIG. 17 shows a display example when the two-dimensional GUI-widget according to the present invention is provided.
Figure 18:
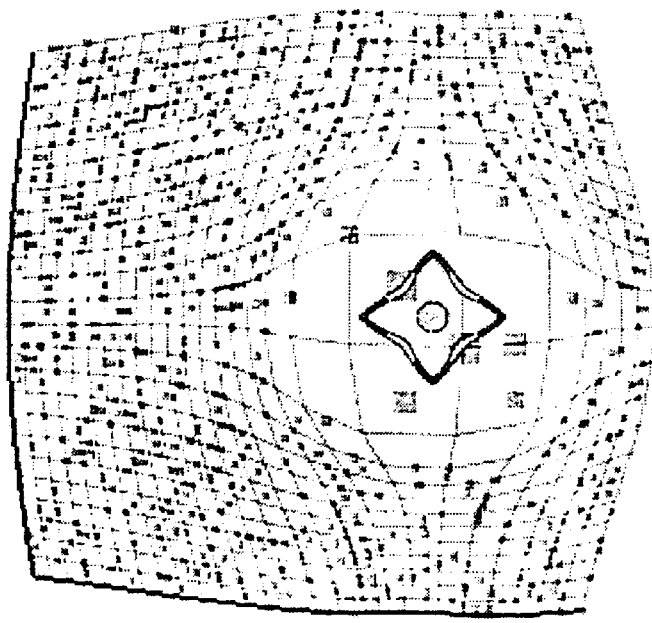
FIG. 18 shows a display example when the two-dimensional GUI-widget according to the present invention is provided.
Figure 19:
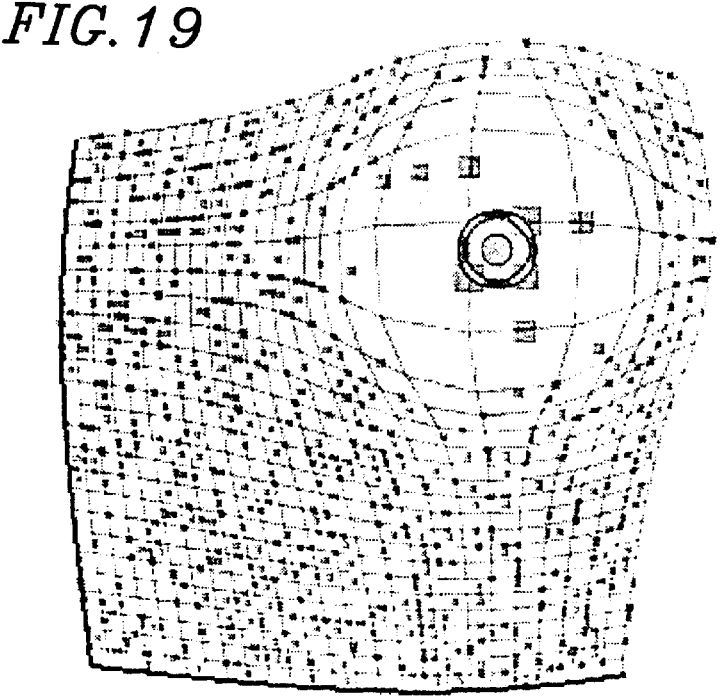
FIG. 19 shows a display example when the two-dimensional GUI-widget according to the present invention is provided.

Herein, the difference between a correlation coefficient (type 1) in FIG. 16 and a correlation coefficient (type 2) in FIGS. 17 and 18 is caused by the difference in calculation of the term of a correlation coefficient in the mapping function described in Embodiment 1. According to type 1, the term of a correlation coefficient is obtained by Formula 4 in FIG. 4D. However, according to type 2, the term of a correlation coefficient is obtained by Formula 5 in FIG. 4E.

Figure 21:
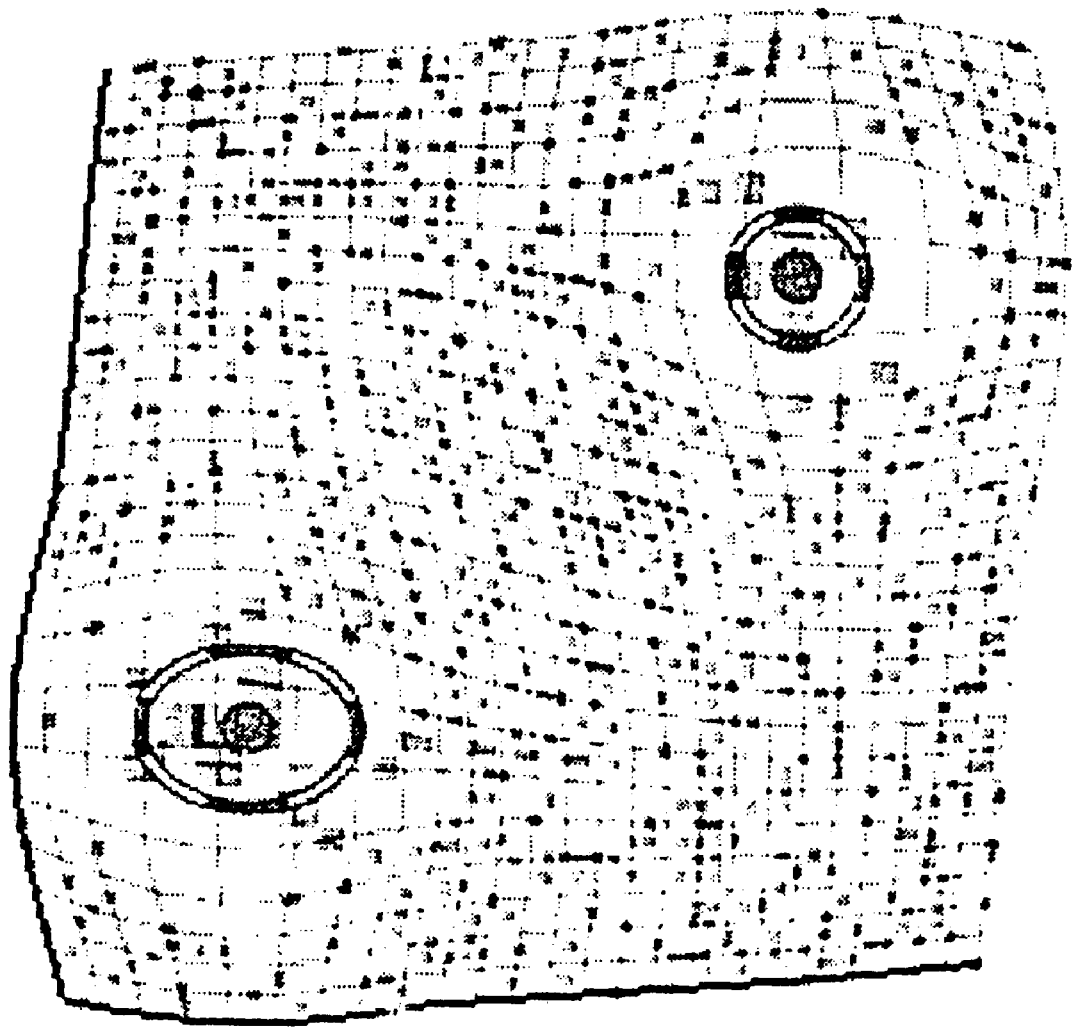
FIG. 21 shows a display example when two two-dimensional GUI-widgets according to the present invention are provided.

FIG. 21 shows a display example in which two GUI-widgets are placed on the display shown in FIG. 2. These GUI-widgets control the mapping functions similar to those in FIGS. 3, and 13 to 19. The respective GUI-widgets are used for altering parameters of different parameter sets. In the present embodiment, first, an attribute value of a display attribute is calculated separately for two parameter sets. In the case of a monotonous increase type function, the attribute values for two parameter sets are averaged, and in the case of an angular type function, the attribute values for two parameter sets are added to each other, whereby an attribute value of a display attribute of interest is calculated.

Furthermore, in the case where a plurality of displayed GUI-widgets are selected by a predetermined user's input operation, an operation of altering a parameter of one of the plurality of GUI-widgets may alter a parameter of the mapping function assigned to another GUI-widget. For example, in the case where a user operates a GUI-widget so as to increase a velocity parameter, a velocity parameter of the mapping function assigned to the GUI-widget may be increased, whereas a velocity parameter of the mapping function assigned to another GUI-widget may be decreased.

Embodiment 3

In the present embodiment, a GUI-widget which controls a three-dimensional mapping function will be described. A three-dimensional GUI-widget expresses a two-dimensional dual-circular shape by using a sphere.

Figure 22:
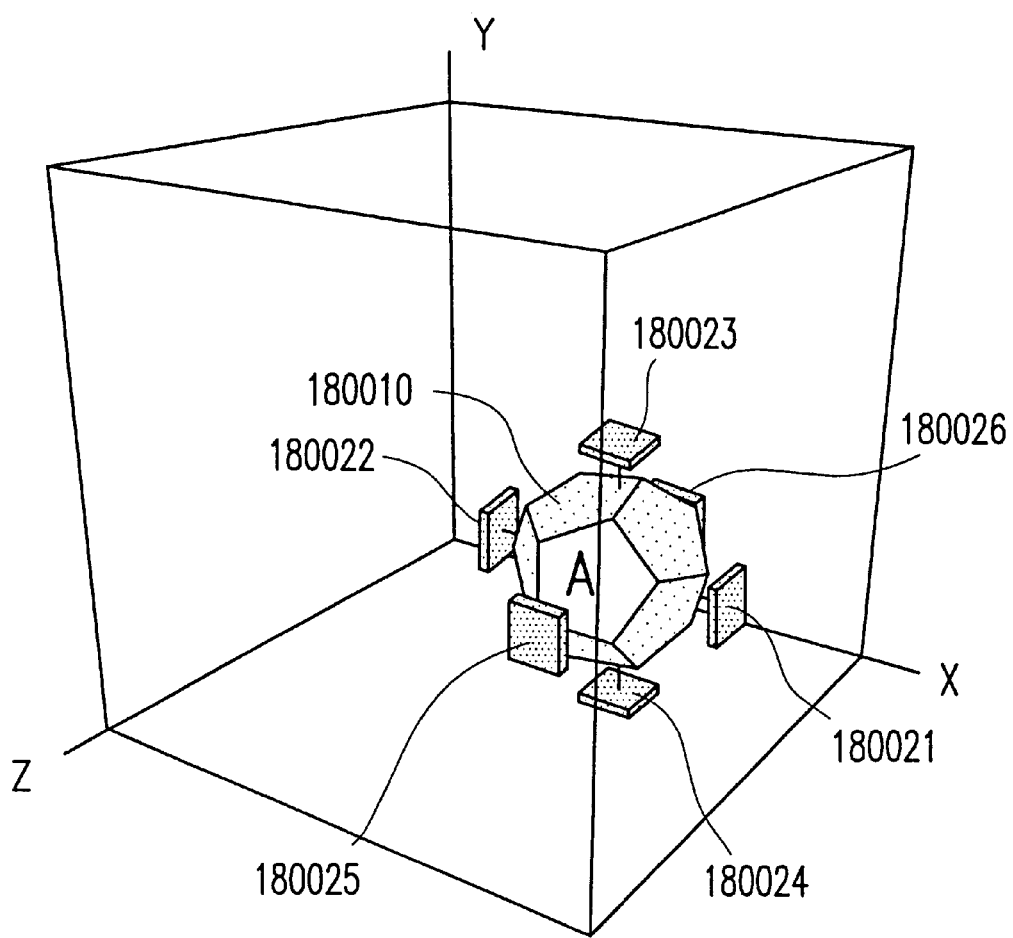
FIG. 22 illustrates a method for operating a three-dimensional GUI-widget according to the present invention.

In FIG. 22, reference numeral 180010 denotes an inner sphere of a GUI-widget, and reference numerals 180021 to 180026 denote curved surfaces of an outer sphere. In the same way as in the two-dimensional GUI-widget in the first embodiment, a position of the inner sphere 180010 represents a center in a parameter set of the mapping function, the curved surfaces 180021 and 180022 represent a standard deviation of x, the curved surfaces 180023 and 180024 represent a standard deviation of y, and the curved surfaces 180025 and 180026 represent a standard deviation of z.

In the three-dimensional GUI-widget of the present invention, the inner sphere 180010 revolves in a direction opposite to a rotation of a three-dimensional display. When an arbitrary surface of the inner sphere 180010 is selected, an operation of moving the inner sphere 180010 is conducted only in a direction normal to the selected surface until the selection is terminated.

Figures 23, 24:
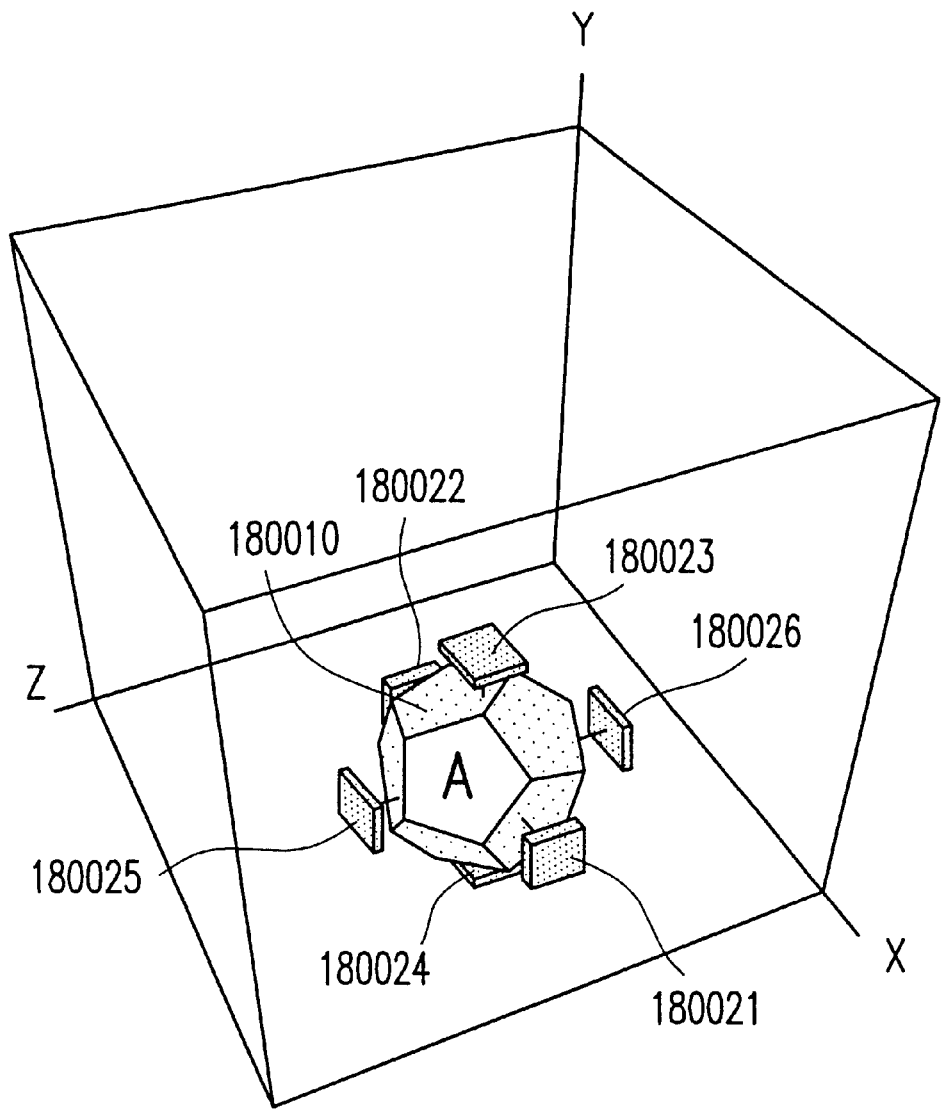
FIG. 23 illustrates a method for operating the three-dimensional GUI-widget according the present invention.
FIG. 24 illustrates a function of representing an altered amount of a parameter in the mapping function according to the present invention.

FIG. 23 shows that the three-dimensional display in FIG. 22 is rotated. In FIGS. 22 and 23, a surface A represents the same surface. More specifically, the curved surfaces 180021 to 180026 rotate so as to follow the display rotation: whereas the inner sphere 180010 looks as if it is not moving due to its revolution.

When the surface A is selected in FIG. 23, and a movement operation is conducted, in the case of a plus movement operation, the GUI-widget moves outward (toward a user) in a direction normal to the surface A. In the case of a minus movement operation, the GUI-widget moves inward (away from the user). This similarly applies to the other surfaces of the inner sphere 180010.

The above-mentioned operation and rotation of a three-dimensional space are repeated, whereby the GUI-widget can be freely moved in a three-dimensional space.

The curved surfaces 180021 to 180026 each representing standard deviation of each axis move in accordance with the rotation of the three-dimensional display. More specifically, a straight line connecting the center of the curved surface 180021 to the center of the curved surface 180022 is kept parallel to an x-axis; a straight line connecting the center of the curved surface 180023 to the center of the curved surface 180024 is kept parallel to a y-axis; and a straight line connecting the center of the curved surface 180025 to the center of the curved surface 180026 is kept parallel to a z-axis. For example, in the case where the user conducts a plus movement operation with respect to the curved surface 180021, the curved surface 180021 is moved away from the inner sphere 180010 in parallel with the x-axis. In the case where the user conducts a minus movement operation with respect to the curved surface 180021, the curved surface 180021 is moved so as to be close to the inner sphere 180010.

The above-mentioned plus movement operation and minus movement operation should be defined in the following manner.

First, regarding a line normal to a surface of interest (in the case of a curved surface, a surface contacting the center of the curved surface), an outward direction of a GUI-widget is defined as a plus direction, and an inward direction thereof is defined as a minus direction. The surface of interest and its normal line are projected onto a plane parallel to the user's line of sight. It is determined whether the movement direction is plus or minus, based on the direction of a mouse cursor moved by the user relative to the normal line.

As described above, the GUI-widget of the present invention can be freely moved in a three-dimensional display.

Embodiment 4

In the present embodiment, an operation of at least two mapping functions and a constraint of the control of parameters of a mapping function will be described, in the case where a plurality of mapping functions are present.

An operation of mapping functions is required for uniquely determining an attribute value of a display attribute in the case where a plurality of mapping functions control the same display attribute in the same data display as shown in FIG. 21. The operation includes several kinds. In the case of an angular type mapping function, examples of the operation include averaging return values of the mapping functions, and obtaining a maximum value, a minimum value, or a product of the return values. In the case of a monotonous increase type mapping function, examples of the operation include averaging, adding, and obtaining a return value of the mapping function at which a slope is largest. Although any operation can be adopted, it is effective to allow a user to select an operation through a menu or the like.

The constraint of the control of parameters of the mapping function refers to a situation wherein when a parameter of an arbitrary mapping function is altered among a plurality of mapping functions which have a constraint relationship with each other, a parameter of another mapping function is also altered simultaneously. More specifically, when a user operates a GUI-widget which is assigned a mapping function or an application program alters a parameter of an arbitrary mapping function, a parameter of a mapping function which has a constraint relationship with these mapping functions is also altered.

For example, in the case where two mapping functions are present on the same display as shown in FIG. 21, when a position of one mapping function is moved by using a GUI-widget, a position of the other mapping function is also moved simultaneously; or, when a velocity of one mapping function with respect to an abscissa axis is increased, a velocity of the other mapping function with respect to an abscissa axis is also decreased.

In the present embodiment, two types of constraints are prepared. One is a constraint between two mapping functions, and the other is a constraint between any mapping functions in a group including a plurality of mapping functions.

First, regarding the former type of constraint, it is assumed that parameter sets of two mapping functions which have a constraint relationship are a and b, respectively. When a user operates a parameter included in the parameter set a, a change amount of a parameter included in the parameter set b can be expressed by Formula 10 in FIG. 24 by using a function.

In Formula 10, i and j are identifiers representing parameters included in the parameter sets a and b, and i and J control the same parameter when i=J. There may be a plurality of parameters which correspond to variables of the function. Formula 10 shows an alteration of a parameter included in the parameter set b when a parameter included in the parameter set a is operated. In general, Formula 10 does not show a reverse relationship, that is, an alteration of a parameter included in the parameter set a when a parameter included in the parameter set b is operated. However, assuming that the reverse relationship always holds, the reverse relationship can be expressed by a reverse function of Formula 10.

The latter type of constraint refers to a situation wherein when a user operates a parameter included in a parameter set of a mapping function in a group, an arbitrary parameter included in parameter sets of all the other mapping functions is altered. Assuming that a parameter set of a mapping function operated by a user is a, and a parameter set which is altered simultaneously with the user's operation is b, a change amount of a parameter included in the parameter set b is expressed by Formula 10. The difference in meaning between the functions used in the former and latter constraints is that the parameter sets a and b indicate particular parameter sets in the former constraint, whereas the parameter sets a and b indicate arbitrary parameter sets belonging to the group in the latter constraint.

Figure 25:
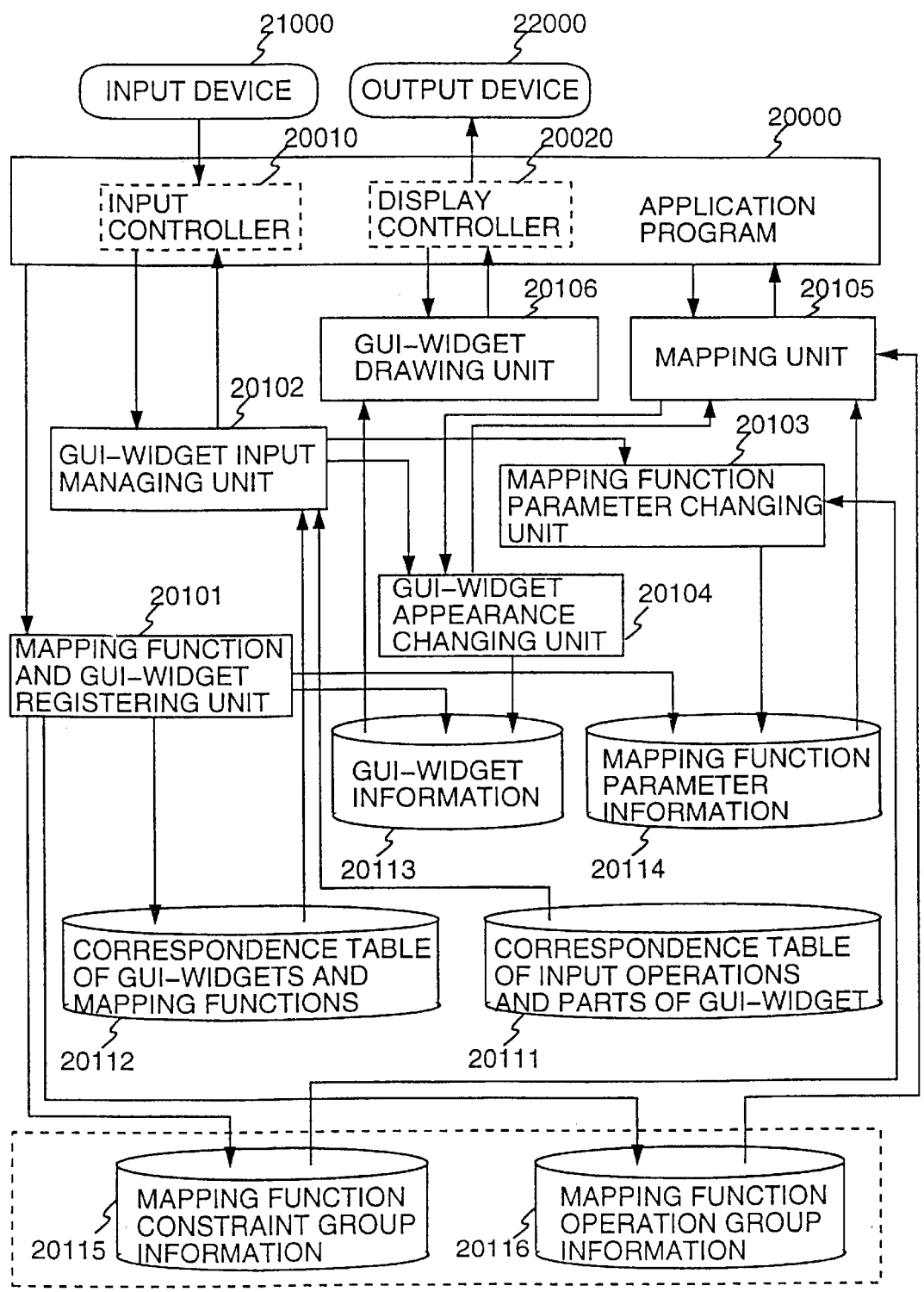
FIG. 25 is a diagram showing a logic structure for practicing another embodiment of the present invention.

FIG. 25 is a block diagram for realizing, as a system, an operation of a plurality of mapping functions and a constraint of the control of a parameter. FIG. 25 is different from FIG. 8 in that mapping function constraint group information 20115, mapping function operation group information 20116, and a reference relationship of data required for these are added to FIG. 25.

FIGS. 26 and 27 respectively show description examples of the mapping function operation group information 20116 and the mapping function constraint group information 20115. In both the description examples, a plurality of mapping functions to be operated or constrained are managed as a group.

The mapping function operation group information 20116 is described in a table including a group ID, a list of parameter set IDs of mapping functions, and an operation type. A group OG001 in FIG. 26 includes three parameter sets PS001, PS002, and PS003, and means that an average of computation results by mapping functions corresponding to the respective parameter sets is taken.

The mapping function constraint group information 20115 classifies both two types of constraints described above into a group in a broad sense as a management unit of a constraint. That is, in the case where there is a constraint between two arbitrary mapping functions, these two mapping functions are classified as one group.

FIG. 27 shows a description example, which is described in a table including a group ID, a constraint type, a list of parameter set IDs, a function for calculating a change amount of a parameter due to a constraint, a parameter type which becomes a variable of the function, and a parameter type of a return value of the function.

The constraint type refers to two types of constraints as described above. In FIG. 27, the constraint between two mapping functions is referred to as OneToOne, and the constraint in a group in a narrow sense is referred to as Group. In the case of OneToOne type, it should be clarified which of two mapping functions is to constrain ("side a which constrains") and which of two mapping functions is to be constrained ("side b which is constrained"). In the present embodiment, in the list of parameter set IDs, "the side a which constrains" is described in the first term of the list, and "the side b which is constrained" is described in the second term of the list. In FIG. 27, pa and pb denote parameters of "the side a which constrains" and those of "the side b which is constrained", respectively. In the case where the constraint type is Group, "the side awhich constrains " and "the side b which is constrained" refer to arbitrary parameter sets included in the group.

Next, the present embodiment will be described in detail with reference to FIG. 25.

In FIG. 25, a mapping function and GUI-widget registering unit 20101 receives a request from an application program 20000, and registers a mapping function and a GUI-widget for controlling the mapping function in a correspondence table of GUI-widgets and mapping functions 20112, GUI-widget information 20113, and mapping function parameter information 20114 in a manner as described later.

In the case where the mapping function and GUI-widget registering unit 20101 receives a request from the application program 20000 that a plurality of mapping functions are registered as an operation group, the mapping function and GUI-widget registering unit 20101 adds a plurality of mapping functions specified by the application program 20000 to the mapping function operation group information 20116 as an operation group.

In the case where the mapping function and GUI-widget registering unit 20101 receives a request from the application program 20000 that a plurality of mapping functions are registered as a constraint group, the mapping function and GUI-widget registering unit 20101 adds a plurality of mapping functions specified by the application program 20000 to the mapping function constraint group information 20115 as a constraint group.

When the above-mentioned three kinds of registrations are conducted, a GUI-widget ID-parameter set ID pair, an operation group ID, and a constraint group ID are returned to the application program 20000.

The GUI-widget input managing unit 20102 determines whether or not input operation information sent from, particularly an input controller 20010 in the application program 20000, is an input to a GUI-widget, by referring to the correspondence table of GUI-widgets and mapping functions 20112 and a correspondence table of input operations and parts of GUI-widget 20111. Herein, if the input operation information is an input to the GUI-widget, the GUI-widget input managing unit 20102 sends an ID and an operation variable of the GUI-widget of interest to a GUI-widget appearance changing unit 20104, and sends a parameter set ID and an operation variable of the mapping function corresponding to the GUI-widget of interest to a mapping function parameter changing unit 20103.

The GUI-widget appearance changing unit 20104 rewrites appearance information of the GUI-widget described in the GUI-widget information 20113, based on the ID and operation variable of the GUI-widget sent from the GUI-widget input managing unit 20102. The mapping function parameter changing unit 20103 rewrites parameter information described in the mapping function parameter information 20114, based on the parameter set ID and operation variable sent from the GUI-widget input managing unit 20102.

Furthermore, the mapping function parameter changing unit 20103 searches for a constraint group which includes the corresponding parameter set ID, by referring to the mapping function constraint group information 20115. If the corresponding group is present, a constraint of the group is executed to alter a parameter, and the mapping function parameter information 20114 is rewritten. An ID of a parameter set including a parameter altered by the constraint, the altered parameter, and a value after alteration are sent to the GUI-widget appearance changing unit 20104. The GUI-widget appearance changing unit 20104 alters appearance of the corresponding GUI-widget, by referring to the correspondence table of GUI-widgets and mapping functions 20112.

If required, the GUI-widget appearance changing unit 20104 inquires a mapping unit 20105 to alter the position of the GUI-widget. This is required in the case of determining a coordinate value by an operation of mapping functions, when display attributes are coordinates of a data display and a plurality of GUI-widgets are displayed so as to overlap the data display. The position of the GUI-widget represents a center parameter of the corresponding mapping function. In the case of a single mapping function, the position should be proportional to the center parameter of the mapping function. However, in the case where mapping functions are operated, when the position of the GUI-widget is used as it is, the position of the GUI-widget is shifted from an actual display, and a user may feel uncomfortable. In order to eliminate such uncomfortable feelings, the GUI-widget appearance changing unit 20104 inquires the mapping unit 20105 to calculate a central position of the GUI-widget and update the GUI-widget information 20113.

In order to determine if positional correction of a GUI-widget is necessary, the type of a display coordinate to be controlled should be described with respect to an individual GUI-widget-parameter set pair in the correspondence table of GUI-widgets and mapping functions 20112. This information is sent from the application program 20000 when the application program 20000 requests registration with respect to the mapping function and GUI-widget registering unit 20101.

The mapping unit 20105 converts an attribute value of an attribute to be converted into an attribute of a display attribute, with respect to an operation group ID or a parameter set ID and an attribute value of an attribute to be converted sent from the application program 20000, by referring to the mapping function operation group information 20116 and the mapping function parameter information 20114.

The GUI-widget drawing unit 20106 receives a request from mainly a display controller 20020 of the application program 20000, and generates appearance of a current GUI-widget, by referring to the appearance information of the GUI-widget described in the GUI-widget information 20113.

Next, the operation of the present invention will be described with reference to a flow chart shown in FIG. 12.

In FIG. 12, a left part from a broken line shows a representative flow of an application program utilizing the method for controlling a data display of the present invention, and a right part from the broken line shows a flow of processing conducted by a GUI-widget and a mapping function.

First, the processing conducted by a GUI-widget and a mapping function will be described.

The processing conducted by a GUI-widget and a mapping function involves four procedures: step 30101, steps 30102–30104, step 30105, and step 30106. These procedures are appropriately invoked by the application program 20000.

At Step 30101, the mapping function and GUI-widget registering unit 20101 in FIG. 25 conducts an appropriate registration operation in response to a registration request from the application program 20000. The registration request from the application program 20000 is either one of registration of a mapping function and a GUI-widget for controlling the mapping function, registration of an operation of a plurality of mapping functions, and registration of a constraint of a plurality of mapping functions. When the mapping function and GUI-widget registering unit 20101 completes registration, a GUI-widget ID-parameter set ID pair, an operation group ID, and a constraint ID are returned to the application program 20000.

At Steps 30102 to 30104, processing with respect to a user's input operation to a GUI-widget is conducted. First, at Step 30102, the GUI-widget input managing unit 20102 in FIG. 25 determines to which GUI-widget an input operation is conducted. In the case where the GUI-widget input managing unit 20102 cannot determine to which GUI-widget an input operation is conducted, the GUI-widget input managing unit 20102 returns the processing to the application program 20000. In the case where the GUI-widget input managing unit 20102 can determine to which GUI-widget an input operation is conducted, the GUI-widget input managing unit 20102 stores a GUI-widget ID and a corresponding parameter set ID for the following steps.

At Step 30103, the mapping function parameter changing unit 20103 in FIG. 25 alters parameters of the parameter set indicated by the stored parameter set ID. The mapping function parameter changing unit 20103 further updates parameter values of a parameter set which has a constraint relationship with the parameter set (mapping function).

Next, at Step 30104, the GUI-widget appearance changing unit 20104 in FIG. 25 updates appearance information of the GUI-widget indicated by the stored GUI-widget ID, and updates appearance information of the GUI-widget corresponding to the parameter set in which a parameter value is altered by a constraint. At this time, if the position of the GUI-widget is required to be corrected, the position of the GUI-widget is updated at Step 30105 described later.

After the above-mentioned procedures are completed, the processing is returned to the application program 20000.

At Step 30105, when the mapping function parameter changing unit 20103 in FIG. 25 receives an attribute value of an attribute to be converted, and a parameter set ID or an operation group ID to be used for conversion from the application program 20000, the mapping function parameter changing unit 20103 converts the attribute value of the attribute to be converted to an attribute value of a display attribute.

At Step 30106, the GUI-widget drawing unit 20106 in FIG. 25 receives a request for generating a display from the application program 20000, and generates a display using the newest appearance information on all the registered GUI-widgets.

Next, a flow on the application program side will be described.

The application program is described in the form of event driving. At Step 30001, it is determined whether or not a user conducts an input operation to the input device 21000. In the case where an input operation is not conducted, the procedure proceeds to Step 30003, and in the case where an input operation is conducted, the procedure proceeds to Step 30002.

At Step 30002, the kind of input operation is determined. If the input operation is an input to a GUI-widget of the present invention, an input of registering a mapping function and a GUI-widget, an input of registering an operation group of a mapping function, or an input of registering a constraint group of a mapping function, the procedure proceeds to Steps 30102 or 30101. Furthermore, in the case of another input operation, the procedure proceeds to Step 30003.

In the case where an input operation is not conducted at Step 30001 or in the case where an input operation at Step 30002 is not related to a GUI-widget of the present invention, processing peculiar to the application related to the input operation is conducted at Step 30003.

When Step 30003 is completed, it is checked if renewing a display is necessary at Step 30004. If renewing a display is not necessary, the procedure returns to Step 30001, and if renewing a display is necessary, the procedure proceeds to Step 30005.

At Step 30005, it is determined whether or not an attribute value of an arbitrary attribute is converted into an attribute value of a display attribute. In the case where mapping is necessary, Step 30105 is invoked together with a parameter set ID or an operation group ID used for mapping, whereby an attribute value of an attribute is converted into an attribute value of a display attribute. At Step 30105, the attribute values required to be converted are invoked. When no attribute value is required to be converted any more, the procedure proceeds to Step 30006.

At Step 30006, a display is created by using the attribute value of the display attribute after conversion and the like. At Step 30007, it is determined whether or not the GUI-widget of the present invention is used. In the case where the GUI-widget of the present invention is not used, the procedure returns to Step 30001. In the case where the GUI-widget of the present invention is used, the procedure proceeds to Step 30106, and then returns to Step 30001.

Embodiment 5

In the present embodiment, an application system utilizing the method for controlling a data display of the present invention will be described with reference display examples. In general, the present invention is applicable to any data search/reference system using computer graphics. In the present embodiment, a system for referring to data of residents living in a certain area will be exemplified.

Data includes 5 attributes: name, age, height, weight, and portrait. Data contains attribute values of these attributes on an individual basis. Names are encoded in hexadecimal notation for the purpose of protecting privacy.

Figure 28:
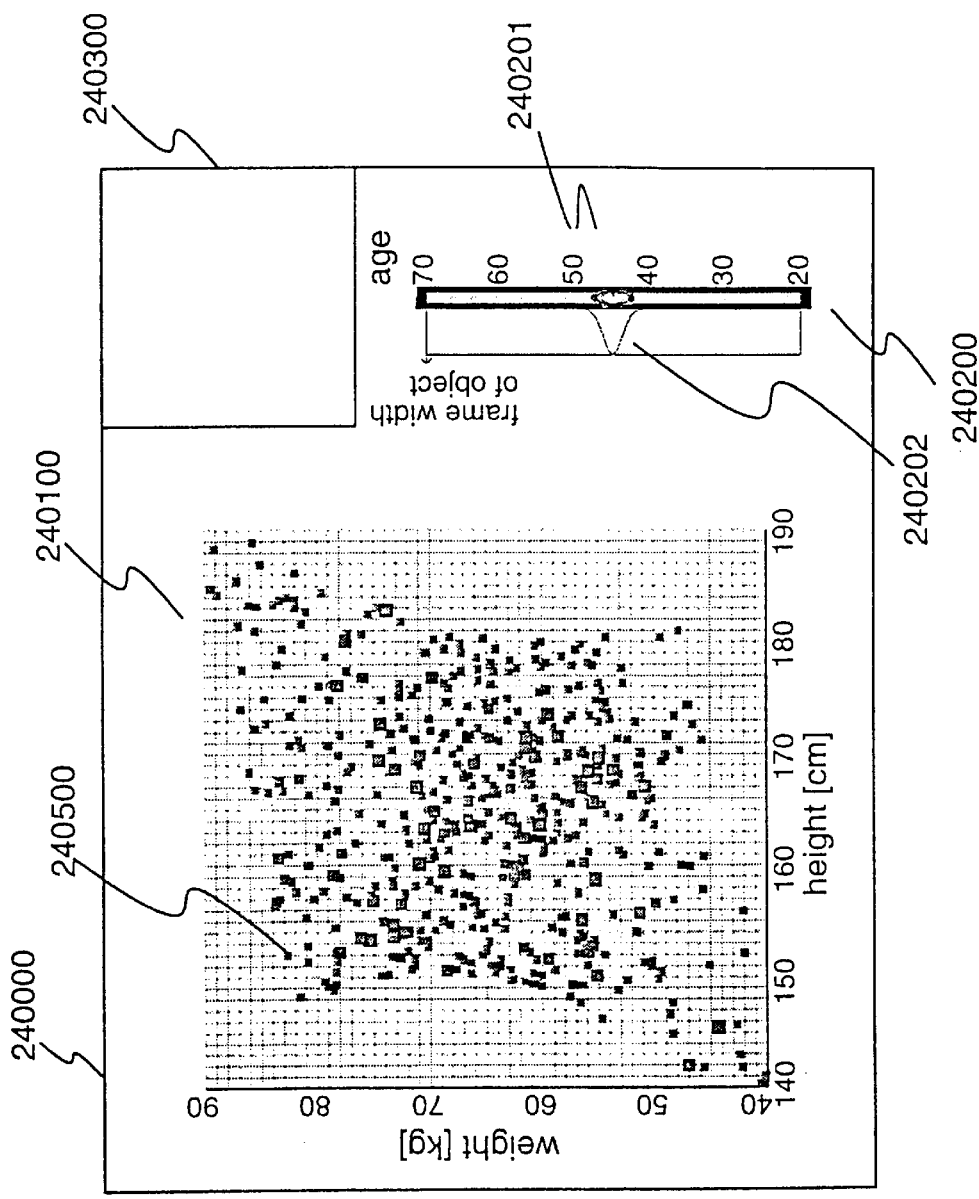
FIG. 28 shows a display example of an application system utilizing a method for controlling a data display according to the present invention.

FIG. 28 shows a display example of the system. An entire display 240000 includes a main display portion 240100 in which data is plotted with the abscissa axis representing a height and the ordinate representing a weight, an age specifying portion 240200 for specifying an age, and a detailed information display portion 240300 for listing information of an arbitrary individual.

In the main display portion 240100, all the residents are plotted with one individual being assigned to one graphics object 240500. When referring to the main display portion 240100, a correlation between heights and weights of the residents of interest in the area can be understood. Furthermore, the size of the graphics object 240500 is freely changed by an enlargement function described later. When the graphics object 240500 is increased to a certain size or larger, a portrait of an individual assigned to the graphics object 240500 is displayed.

The age specifying portion 240200 specifies an age in a slider system, using a GUI-widget 240201 of the method for controlling a data display according to the present invention. An age is mapped onto a frame width of the graphics object 240500 displayed in the main display portion 240100 by an angular type mapping function assigned to the GUI-widget 240201. More specifically, the position of the GUI-widget 240201 on the slider represents a center parameter (i.e., a mean age). The distances between the upper end of an outer circle of the GUI-widget 240201 and the center thereof and between the lower end of the outer circle of the GUI-widget 240201 and the center thereof represent a velocity parameter (i.e., an age range to be specified). Thus, the frame width of the graphics object 240500, representing an individual whose age is close to the mean age, becomes large. The frame width of the graphics object 240500, representing an individual whose age is away from the mean age, becomes smaller in accordance with how far the individual age is away from the mean age. The frame width of the graphics object 240500, representing an individual whose age is out of the specified age range, becomes 0 (which means the frame is eliminated). Furthermore, in order to understand a relationship between an age and a frame width, a correspondence graph 240202 is depicted. When the GUI-widget 240201 is moved, the correspondence graph 240202 is also moved simultaneously. When the outer circle of the GUI-widget 240201 is dragged in a vertical direction, the foot of the correspondence graph 240202 expands.

Figure 29:
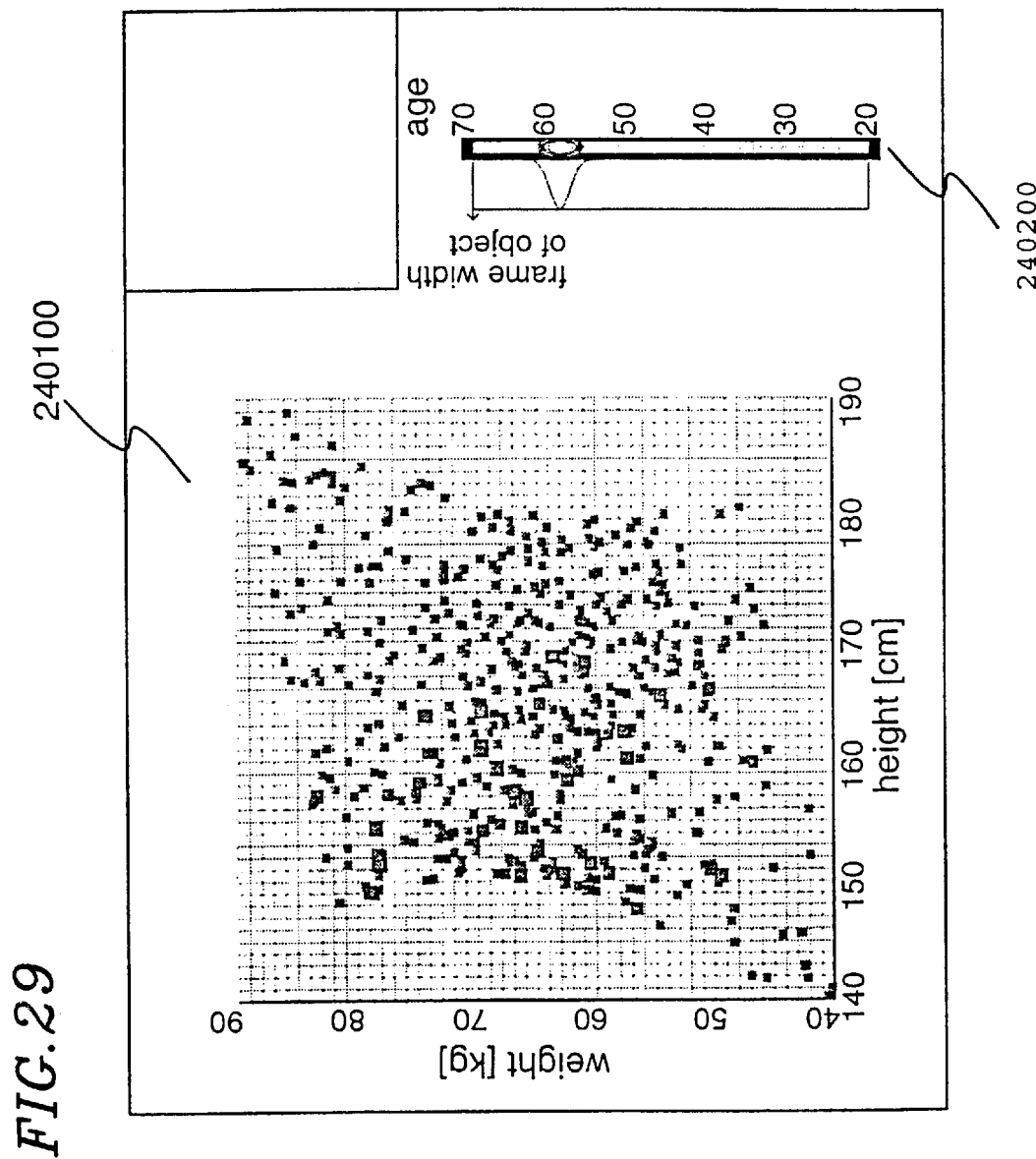
FIG. 29 shows a display example of an application system utilizing a method for controlling a data display according to the present invention.

The frame width changed by the operation of the GUI-widget 240201 is reflected on the graphics object 240500 in the main display portion 240100 at real time, whereby a display is updated. In FIG. 28, the GUI-widget 240201 is placed at age 45. When the GUI-widget 240201 is moved to a position of age 58, a display as shown in FIG. 29 is obtained. In this manner, only by controlling mapping of an age in the age specifying portion 240200 and a frame width of a graphics object, a relationship among a height, a weight, and an age can be easily referred to in the main display portion 240100.

It is assumed that a user is interested in "data of residents each having a height of about 150 cm and a weight of slightly less than 80 kg", and the user wants to know what kind of residents belong to this data. In order to satisfy such user's needs, the system of the present embodiment has a function of modifying a display coordinate system so as to display an enlarged graphics object as in the second embodiment. This function will be described in detail. Display positions of graphics objects are mapped by using a monotonous increase type mapping function, and sizes of the objects are mapped by using an angular type mapping function. Parameters of these functions can be simultaneously controlled with the GUI-widget 240201. The function in the present embodiment is different from that in the second embodiment in that in the second embodiment a range to which the monotonous increase type mapping function is constant, whereas in the present embodiment the range is changed in proportion with a velocity parameter.

Figure 30:
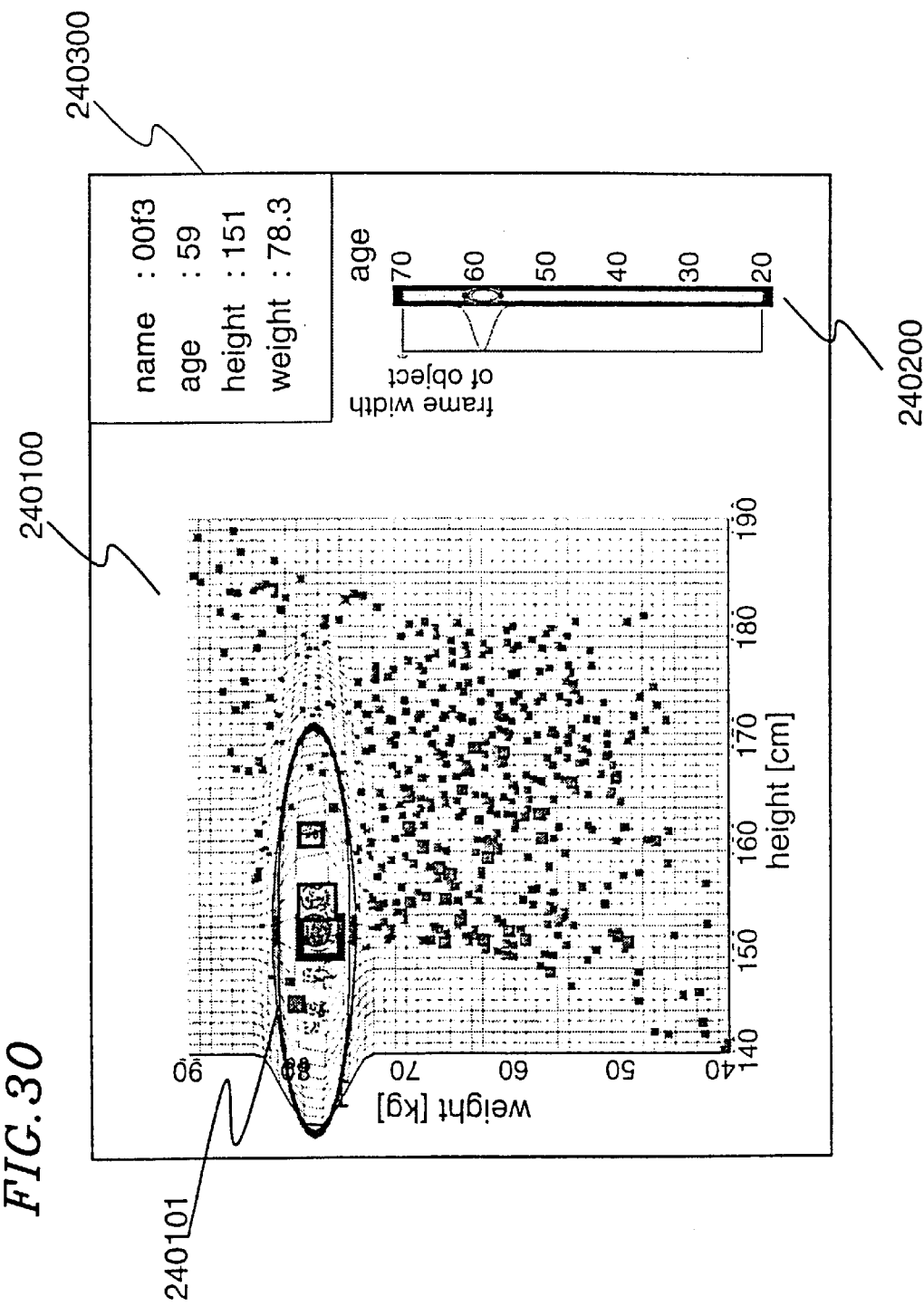
FIG. 30 shows a display example of an application system utilizing a method for controlling a data display according to the present invention.

FIG. 30 shows a display example in which a GUI-widget 240101 is placed in a region of user's interest described above. In the region of user's interest, data is arranged in a horizontal direction, so that the user refers to portraits of residents included in the region of user's interest by expanding the GUI-widget 240101 in a horizontal direction. Thus, an entire image of data can be displayed under the condition that the GUI-widget 240101 is expanded in a horizontal direction, and a display region out of the region of user's interest is kept in linear mapping.

FIG. 30 shows detailed information of an individual in the detailed information display portion 240300. The detailed information display portion 240300 displays detailed information of an individual in which a weight calculated from an expansion ratio and a frame width of a graphics object in the main display portion 240100 becomes a predetermined value or more, and the value becomes maximum. In other words, when a height and a weight are specified by the main display portion 240100, and an age is specified by the age specifying portion 240200, the detailed information display portion 240300 displays data with the highest hit rate among data satisfying the conditions.

Figure 31:
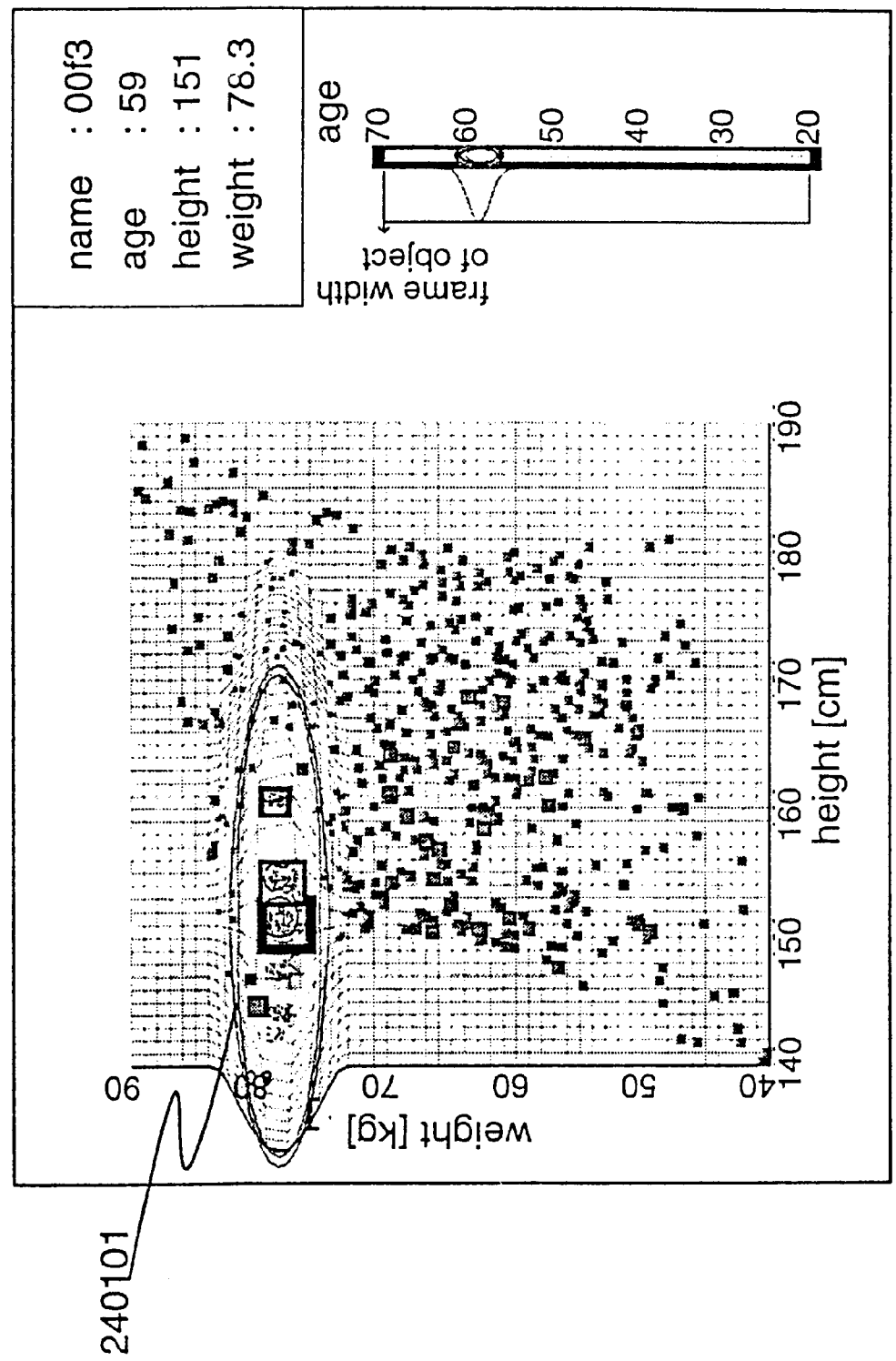
FIG. 31 shows a display example of an application system utilizing a method for controlling a data display according to the present invention.

In order to prevent the GUI-widget 240101 from making it difficult to see a graphics object, the GUI-widget 240101 used in the present embodiment has a function of rendering the portions of the GUI-widget 240101, excluding its frame, transparent by user's instruction. FIG. 31 shows a display example in the case where the GUI-widget 240101 is rendered transparent in FIG. 30. User's instruction can be realized, for example, by the operation such as double click under the condition that a mouse cursor is placed on the GUI-widget 240101. When double click is conducted under the condition that the GUI-widget 240101 is displayed transparent, a display is returned to an original state.

Figure 32:
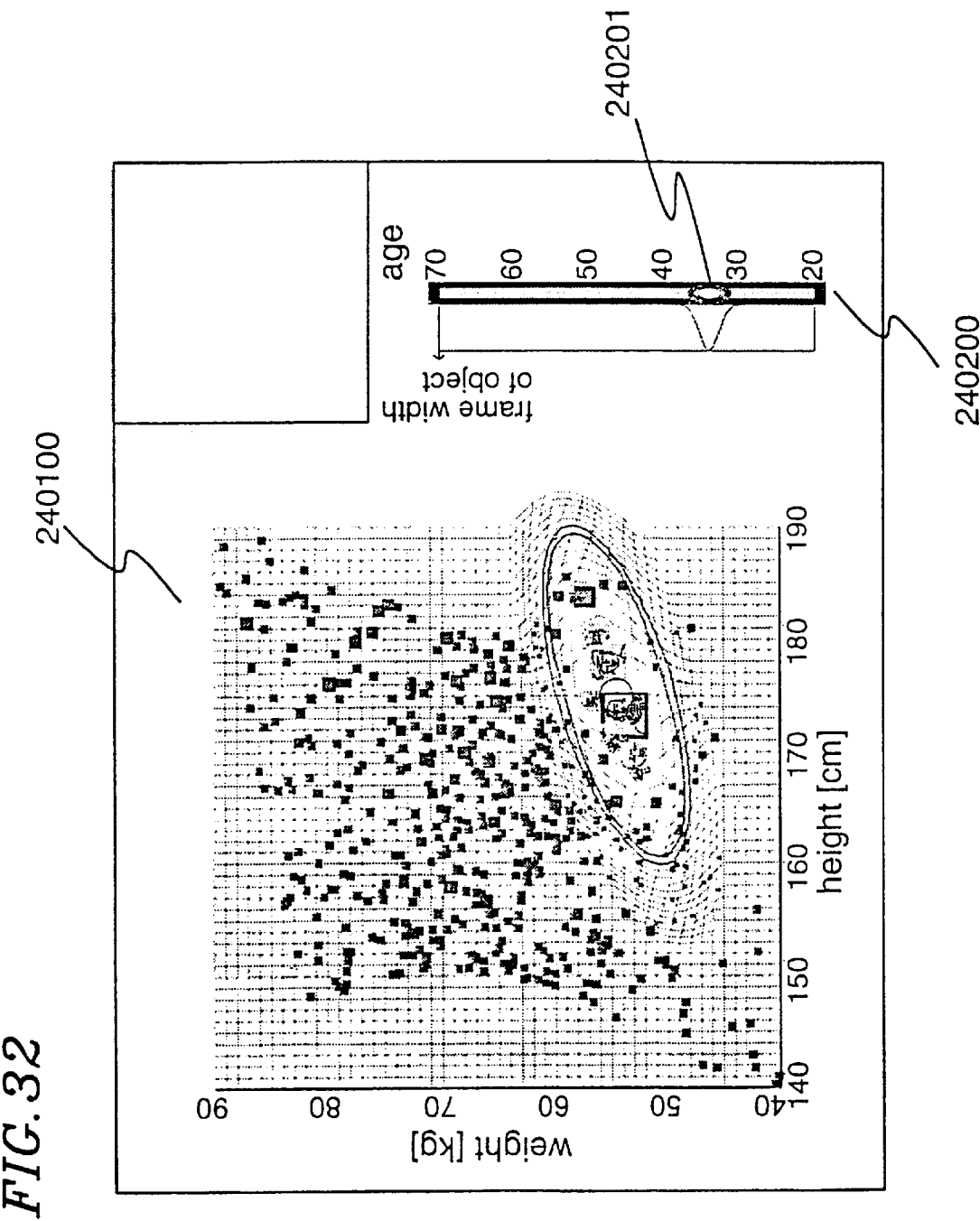
FIG. 32 shows a display example of an application system utilizing a method for controlling a data display according to the present invention.

FIG. 32 shows a display obtained by altering a parameter of the mapping function by operating the GUI-widget 240101 in the main display portion 240100 in the state shown in FIG. 30, and moving the GUI-widget 240201 in the age specifying portion 240200 to a position of about 33 years old. The GUI-widget 240101 is rendered transparent.

Figure 33:
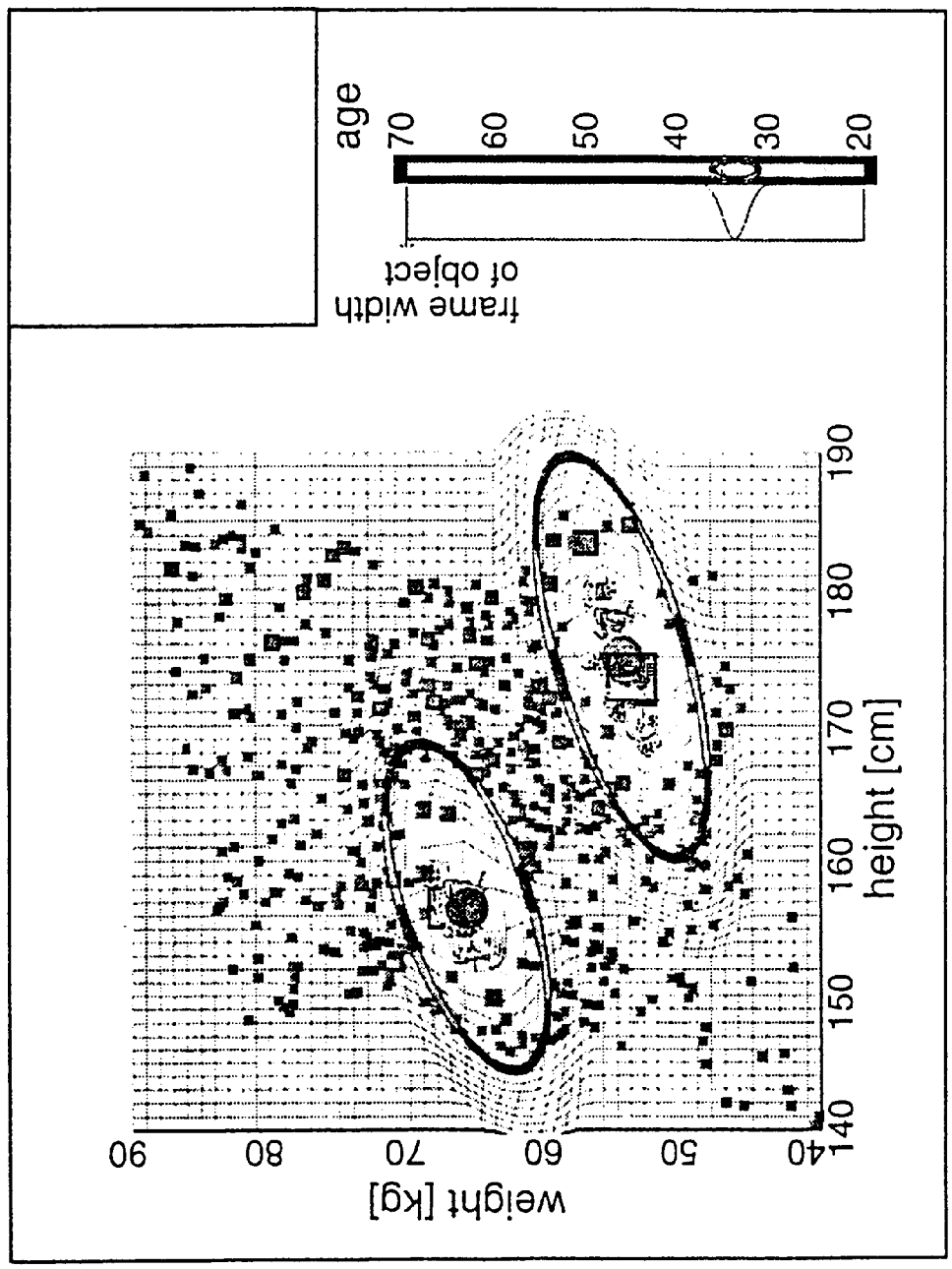
FIG. 33 shows a display example of an application system utilizing a method for controlling a data display according to the present invention.
Figure 34:
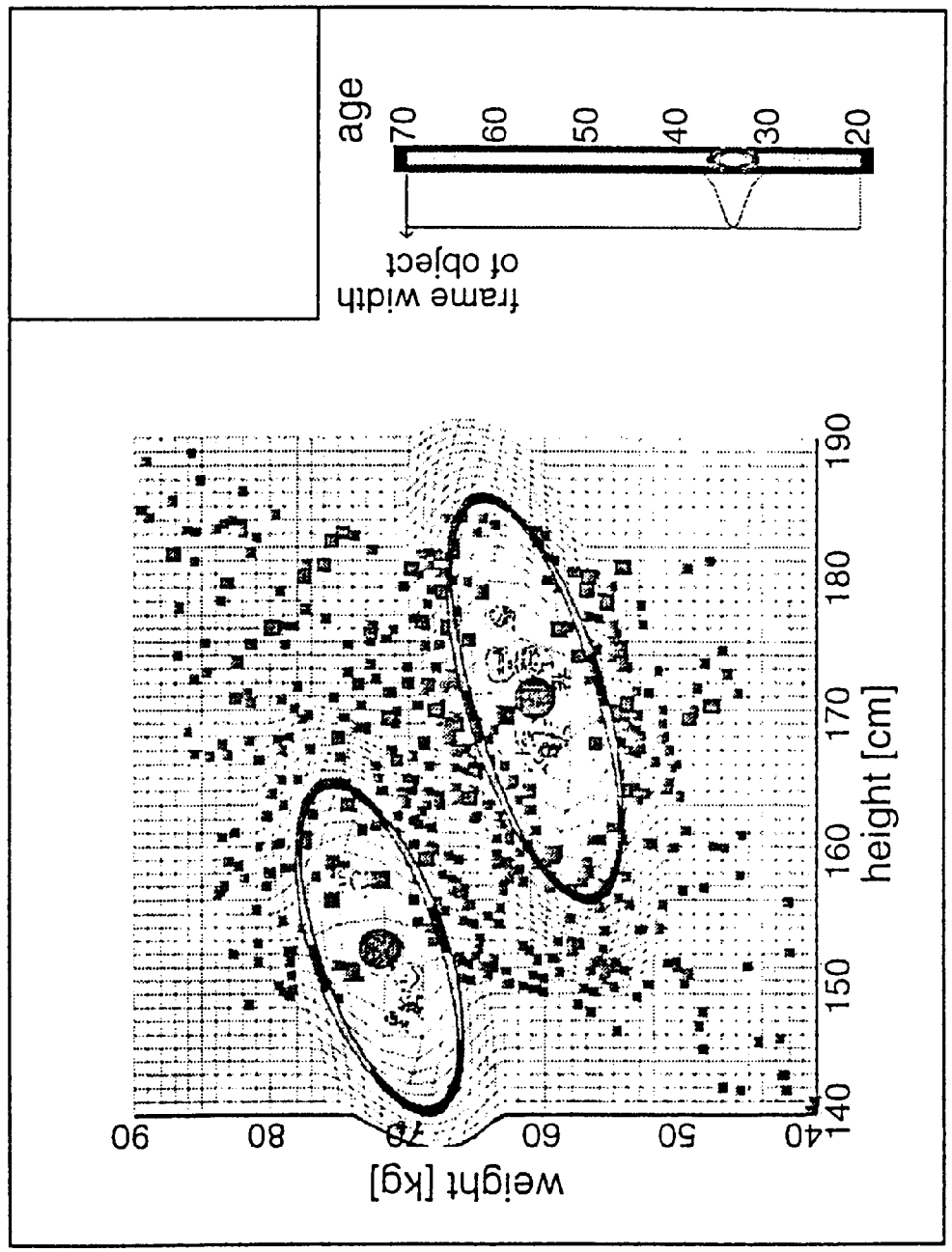
FIG. 34 shows a display example of an application system utilizing a method for controlling a data display according to the present invention.

Next, one GUI-widget is added to the main display portion 240100. FIG. 33 shows a display in this case. In FIG. 33, each graphics object is determined for its position and size by the operation of mapping functions assigned to two GUI-widgets. Thus, the details of two regions can be simultaneously referred to. Herein, a constraint is given, in which center parameters of the mapping functions assigned to two GUI-widgets are simultaneously moved. FIG. 34 shows a display obtained by moving a center of one GUI-widget under this condition. As is understood from FIG. 34, due to the constraint, two GUI-widgets are simultaneously moved while keeping a constant distance therebetween.

Embodiment 6

The present embodiment shows that a multi-dimensional mapping function can be expressed as a function of a function representing an arbitrary shape.

In the first to fifth embodiments of the present invention, as an angular type function of the one-dimensional mapping function, the second expression of Formula 1 shown in FIG. 4A is used, and as a monotonous increase type function of the one-dimensional mapping function, Formula 2 in FIG. 4B is used.

A multi-dimensional mapping function also uses the above-mentioned two formulae, and a function representing an arbitrary configuration is substituted into a variable x in these formulae. More specifically, in the case of a two-dimensional mapping function, assuming that a function representing an arbitrary configuration is $R(x,y)$, the angular type function and the monotonous increase type function are expressed as $g(R(x,y))$ and $f(R(x,y))$, respectively. Herein, it is assumed that $R(x,y)$ is expressed as Formula 11 in FIG. 35. It is understood that the function represented by Formula 11 is a function representing an arbitrary oval, and the angular type mapping function represented by Formula 4 in FIG. 4D and the monotonous increase type mapping function represented by indefinite integration of Formula 4 are functions of a function representing an oval. Due to the effect of the function representing an oval, a modified coordinate system shown in the first to fifth embodiments exhibits an oval. It should be noted that only in the case where an application range of the mapping function is changed in proportion with velocity parameters $\sigma x$ and $\sigma y$, the modified coordinate system visually reproduces the configuration of $R(x,y)$. Therefore, since the application range of the mapping function is constant irrespective of velocity parameters in the second embodiment, the display examples shown in FIG. 3, and FIGS. 7 to 19 do not visually exhibit an oval.

Furthermore, assuming that an outer circle of a dual-circular GUI-widget of the present invention is formed based on R(x,y), a user can intuitively understand the state of the current mapping. In the GUI-widgets shown in the first to fifth embodiments, the mapping functions assigned to the GUI-widgets utilize an elliptic function, so that the outer circle also has an oval shape based on a parameter value.

Furthermore, R(x,y) may be a function representing any rectangle, a function representing a modified oval, or the like. In this case, an outer circle of a dual circular GUI-widget may be formed based on these functions.

As described above, according to the present invention, a method for controlling a display of data having at least one attribute is provided. The method includes: an attribute conversion step of converting an arbitrary attribute of data into a display attribute by using a mapping function; a display step of displaying data based on the display attribute; and a parameter changing step of changing a parameter of the mapping function, whereby a parameter of the mapping function for converting an attribute of data into a display attribute can be changed, and the results can be reflected on the display.

A parameter of the mapping function is changed by user's instruction in the parameter changing step, whereby the user can change a parameter of the mapping function.

A GUI-widget suitable for changing a parameter is provided, which allows a user to easily change a parameter of the mapping function.

When the mapping function is an angular type function (in which an attribute value of a display attribute becomes a local maximum at a certain attribute value of an attribute to be converted), a parameter set of the mapping function includes at least one of a local maximum value of a display attribute, an attribute value of an attribute to be converted when the display attribute becomes a local maximum, and a velocity to a local maximum value, whereby mapping with high power of expression using three parameters is made possible with respect to an angular type mapping function.

When the mapping function is a monotonous increase type function (in which a slope of the mapping function becomes a local maximum at a certain attribute value of an attribute to be converted), a parameter set of the mapping function includes at least one of a maximum value of a slope, an attribute value of an attribute to be converted when the slope becomes a local maximum, and a velocity to a local maximum value, whereby mapping with high power of expression using three parameters is made possible with respect to a monotonous increase type mapping function.

When the mapping function is a function for converting a plurality of attributes to be converted into one display attribute, and is an angular type function (in which an attribute value of a display attribute becomes a local maximum at a certain attribute value of an attribute to be converted), a parameter set of the mapping function includes at least one of a local maximum value of a display attribute, an attribute value of each attribute to be converted when the display attribute becomes a local maximum, a velocity to a local maximum value in each attribute to be converted, a correlation between attributes to be converted, and rotation of a parameter space, whereby mapping with high power of expression using five parameters is made possible with respect to a multi-dimensional angular type mapping function.

When the mapping function is a function for converting a plurality of attributes to be converted into the same number of display attributes as those of the attributes to be converted, wherein the attributes to be converted correspond to the display attributes in one to one relationship, and the mapping function is also a monotonous increase type function (in which a slope of the function becomes a local maximum at a certain attribute value of an attribute to be converted), a parameter set of the mapping function includes at least one of a local maximum of a slope, an attribute value of each attribute to be converted when the slope becomes a local maximum, a velocity to a local maximum value in each attribute to be converted, a correlation between attributes to be converted, and rotation of a parameter space, whereby mapping with high power of expression using 5 parameters is made possible with respect to a multi-dimensional monotonous increase type mapping function.

In the above-mentioned mapping function, the angular type mapping function or the monotonous increase type mapping function is applied to an arbitrary range of attribute values of an attribute to be converted, and linear mapping is conducted out of this range, whereby a region where the mapping function is applied can be clarified.

The shape of the GUI-widget represents a parameter value contained in a parameter set of the mapping function, whereby a user can intuitively change a parameter of the mapping function.

When an attribute to be converted is a display attribute, and the attribute to be converted and the display attribute are allowed to be identical with each other, a display attribute itself can be distorted.

When the GUI-widget has a dual circular shape, color or a size of an inner circle represents a local maximum value of the mapping function, a position of the GUI-widget in a data display represents an attribute value of an attribute to be converted at the local maximum value of the mapping function, and a distance between an outer circle and the inner circle represents a velocity to the local maximum value, whereby a user can freely change three parameters in an angular type mapping function.

When the GUI-widget has a dual circular shape, color or a size of an inner circle represents a local maximum value of a slope of the mapping function, a position of the GUI-widget in a data display represents an attribute value of an attribute to be converted at the local maximum value of the slope, and a distance between an outer circle and the inner circle represents a velocity to the local maximum value, whereby a user can freely change three parameters in a monotonous increase type mapping function.

When the GUI-widget has a dual circular shape, color or a size of an inner circle represents a local maximum value of the mapping function, a position of the GUI-widget in a data display represents an attribute value of each attribute to be converted at the local maximum value of the mapping function, a distance between an arbitrary arc of an outer circle and the inner circle represents a velocity to the local maximum value at a certain attribute to be converted, another arc of the outer circle represents a correlation between attributes to be converted, and rotation of the GUI-widget represents rotation of a parameter space, whereby a user can freely change five parameters in a multi-dimensional angular type mapping function.

When the GUI-widget has a dual circular shape, color or a size of an inner circle represents a local maximum value of a slope of the mapping function, a position of the GUI-widget in a data display represents an attribute value of each attribute to be converted at the local maximum value of the slope, a distance between an arbitrary arc of an outer circle and the inner circle represents a velocity to the local maximum value at a certain attribute to be converted, another arc of the outer circle represents a correlation between attributes to be converted, and rotation of the GUI-widget represents rotation of a parameter space, whereby a user can freely change five parameters in the multi-dimensional monotonous increase type mapping function.

When there are at least three attributes to be converted in the mapping function, and the above-mentioned dual circular GUI-widget is represented three-dimensionally by using a sphere, an inner sphere is divided into regions in the shape of a mesh by using an arbitrary rectangle. A user can rotate the inner sphere by an arbitrary angle by a predetermined input operation, and the GUI-widget is moved only in a direction normal to the rectangle by a predetermined user's input operation with respect to the rectangle, whereby the user can freely change a position of the three-dimensional GUI-widget.

When there are at least three attributes to be converted in the mapping function, and the above-mentioned dual circular GUI-widget is represented three-dimensionally by using a sphere, an inner sphere is divided into regions in the shape of a mesh by using an arbitrary rectangle, and the GUI-widget is moved only in a direction normal to the rectangle by a predetermined user's input operation with respect to the rectangle under the condition that the inner sphere always revolves in a direction opposite to the rotation of a data display space, whereby the user can freely change a position of the three-dimensional GUI-widget.

The above-mentioned mapping function is expressed by an operation of a plurality of mapping functions, whereby in the case where a plurality of mapping functions control the same display attribute value, the display attribute value can be obtained uniquely.

When the above-mentioned mapping function is expressed by an operation of a plurality of mapping functions, the display attributes are coordinates in a data display, and the dual-circular GUI-widget is displayed so as to overlap the data display. Each display position of the GUI-widget assigned to the respective mapping functions is calculated by an operation of the mapping functions, whereby a positional shift between the data display and the GUI-widget can be corrected.

When there are a plurality of mapping functions, a constraint regarding the change in parameter is provided between two or more arbitrary mapping functions. Thus, when a value of a parameter of a certain mapping function is changed, a value of a parameter of another mapping function can also be changed simultaneously.

When the above-mentioned constraint regarding the change in parameter is calculation of a parameter value controlled by the constraint by an arbitrary function, a parameter value can be changed in accordance with the arbitrary function, with respect to the change in parameter by the constraint.

The above-mentioned multi-dimensional mapping function is a function of a function representing an arbitrary shape having a center, and the above-mentioned angular type mapping function and the slope of the above-mentioned monotonous increase type mapping function become a local maximum at the center of the arbitrary shape. Thus, mapping can be performed in accordance with a shape in a space of attributes to be converted.

The above-mentioned function representing an arbitrary shape uses the above-mentioned attribute to be converted as a variable, and forms its shape by using a velocity to the local maximum value (center) of each attribute to be converted, a correlation between the attributes to be converted, and rotation of a parameter space among the above-mentioned parameter set of the mapping function, thereby forming a shape with high power of expression.

An outer circle of the dual-circular GUI-widget is formed based on the above-mentioned function representing an arbitrary shape included in the mapping function, whereby a user can easily confirm the function representing a shape used in the mapping function and its parameter values.

A value of an arbitrary parameter in the mapping function is changed by a user's operation with respect to the dual circular GUI-widget, whereby a user can directly change a parameter value.

The objective of the present invention can be achieved by using a computer and a computer-readable recording medium. In the computer-readable recording medium, a program is recorded, which realizes attribute conversion means for controlling a display of data having at least one attribute and converting an arbitrary attribute of data into a display attribute by using a mapping function, display means for displaying data based on the display attribute, and parameter changing means for changing a parameter of the mapping function.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for controlling a data display controlling a display of data including at least one attribute, the method comprising:

an attribute conversion step of converting at least one attribute of the data into a display attribute by using at least one mapping function;

a display step of displaying the data based on the display attribute; and a parameter changing step of changing a parameter of the mapping function, wherein the at least one mapping function includes a shape function and an increase type mapping function in which a derivative of the mapping function becomes a local maximum at the center of the shape function, wherein the function represents an arbitrary shape with at least one attribute to be converted being a variable, and wherein the shape function includes a multi-dimensional function using a plurality of the attributes to be converted as variables, the shape function includes a center parameter representing the center of the shape function, corresponding to each of the variables, a velocity parameter representing a velocity to the center, corresponding to each of the variables, a correlation parameter representing a correlation between the variables, and a rotation parameter representing rotation of a parameter space, and the parameter changing step is a function for calculating one arbitrary value of the display attributes, and includes a step of selecting at least one of the center parameter, the velocity parameter, the correlation parameter, the rotation parameter, and a local maximum value parameter controlling a value of the at least one mapping function when the at least one mapping function is an angular type function which becomes a local maximum at the center of the shape function, the increase type mapping function being obtained from the angular type function by indefinite integration, and using the selected parameter as a parameter set of the at least one mapping function.

2. A method for controlling a data display controlling a display of data including at least one attribute, the method comprising:

an attribute conversion step of converting at least one attribute of the data into a display attribute by using at least one mapping function;

a display step of displaying the data based on the display attribute; and a parameter changing step of changing a parameter of the mapping function, wherein the at least one mapping function includes a shape function and an increase type mapping function in which a derivative of the mapping function becomes a local maximum at the center of the shape function, wherein the function represents an arbitrary shape with at least one attribute to be converted being a variable, and wherein the shape function includes a multi-dimensional function using a plurality of the attributes to be converted as variables, the shape function includes a center parameter representing the center of the shape function, corresponding to each of the variables, a velocity parameter representing a velocity to the center, corresponding to each of the variables, a correlation parameter representing a correlation between the variables, and a rotation parameter representing rotation of a parameter space, and the parameter changing step is a function for calculating values of the same number of the display attributes as the number of the attributes to be converted included in the shape function, and includes a step of selecting at least one of the center parameter, the velocity parameter, the correlation parameter, the rotation parameter, and a local maximum value parameter controlling a value of the increase type mapping function, and using the selected parameter as a parameter set of the at least one mapping function.

3. A method for controlling a data display controlling a display of data including at least one attribute, the method comprising:

an attribute conversion step of converting at least one attribute of the data into a display attribute by using at least one mapping function;

a display step of displaying the data based on the display attribute; and a parameter changing step of changing a parameter of the mapping function, wherein the at least one mapping function includes a shape function and an increase type mapping function in which a derivative of the mapping function becomes a local maximum at the center of the shape function, wherein the function represents an arbitrary shape with at least one attribute to be converted being a variable, and wherein the at least one mapping function includes an angular type mapping function which becomes a local maximum at the center of the shape function, the increase type mapping function being obtained from the angular type mapping function by indefinite integration, the at least one mapping function adopts one of the angular type mapping function and the increase type mapping function in a desired range of an attribute value of the attribute to be converted, and the at least one mapping function executes a linear mapping function out of the range of the attribute value.

4. A method for controlling a data display, controlling a display of data including at least one attribute, the method comprising:

an attribute conversion step of converting at least one attribute of the data into a display attribute by using at least one mapping function;

a display step of displaying the data based on the display attribute; and a parameter changing step of changing a parameter of the mapping function and including a step of changing a parameter by using a GUI-widget, wherein the GUI-widget has a dual-circular shape including one circle and one annular ring, the at least one mapping function includes a function of a shape function, the shape function represents an arbitrary shape with at least one attribute to be converted being a variable, the shape function has a center parameter representing a center of the shape function, at least one of color and a size of the circle represents a local maximum value parameter for controlling a value of the at least one mapping function, a display position of the GUI-widget represents the center parameter representing a center of the shape function, and the annular ring is formed based on the shape function.

5. A method for controlling a data display according to claim 4, wherein the shape function further includes a velocity parameter representing a velocity to the center of the shape function, and a distance between a center of the GUI-widget and the annular ring is determined based on the velocity parameter.

6. A method for controlling a data display according to claim 4, wherein the shape function includes a multi-dimensional function with a plurality of the attributes to be converted being variables, the shape function includes a center parameter representing a center of the shape function, corresponding to each of the variables, a velocity parameter representing a velocity to the center, corresponding to each of the variables, a correlation parameter representing a correlation between the variables, and a rotation parameter expressing rotation of a parameter space, a distance between an arbitrary arc of the annular ring and a center of the GUI-widget represents the velocity parameter, a distance between another arc of the annular ring and a center of the GUI-widget represents the correlation parameter, and rotation of the annular ring represents the rotation parameter.

7. A method for controlling a data display according to claim 4, wherein a value of the arbitrary parameter in the mapping function is changed by a user's operation with respect to the GUI-widget.

8. A method for controlling a data display, controlling a display of data including at least one attribute, the method comprising:

an attribute conversion step of converting at least one attribute of the data into a display attribute by using at least one mapping function;

a display step of displaying the data based on the display attribute; and a parameter changing step of changing a parameter of the mapping function and including a step of changing a parameter by using a GUI-widget, wherein the GUI-widget has a dual-circular shape including one sphere and one hollow sphere, the at least one mapping function includes at least three attributes to be converted, the sphere is divided into mesh-shaped regions by using desired rectangles when the at least three attributes to be converted are displayed in the display step, the sphere is rotated by an angle based on user's instruction, and the GUI-widget is moved in a direction normal to the rectangle based on the user's instruction.

9. A method for controlling a data display, controlling a display of data including at least one attribute, the method comprising:

an attribute conversion step of converting at least one attribute of the data into a display attribute by using at least one mapping function;

a display step of displaying the data based on the display attribute; and a parameter changing step of changing a parameter of the mapping function and including a step of changing a parameter by using a GUI-widget, wherein the GUI-widget has a dual-circular shape including one sphere and one hollow sphere, the at least one mapping function includes at least three attributes to be converted, the sphere is divided into mesh-shaped regions by using desired rectangles when the at lest three attributes to be converted are displayed in the display step, the sphere is revolved in a direction opposite to rotation direction of a data display space, and the GUI-widget is moved in a direction normal to the rectangle based on user's instruction.

* * * * *